US008500548B2

(12) United States Patent
Baerlocher et al.

(10) Patent No.: US 8,500,548 B2

(45) Date of Patent: Aug. 6, 2013

(54) GAMING SYSTEM AND METHOD FOR PROVIDING TEAM PROGRESSIVE AWARDS

(75) Inventors: Anthony J. Baerlocher, Reno, NV (US); Daniel J. DeWaal, Las Vegas, NV (US)

(73) Assignee: IGT, Reno, NV (US)

( * ) Notice: Subject to any disclaimer, the term of this patent is extended or adjusted under 35 U.S.C. 154(b) by 1273 days.

(21) Appl. No.: 11/937,353

(22) Filed: Nov. 8, 2007

(65) Prior Publication Data

US 2009/0124363 A1 May 14, 2009

(51) Int. Cl.
*A63F 13/10* (2006.01)
*A63F 13/12* (2006.01)
*G07F 17/32* (2006.01)

(52) U.S. Cl.
USPC .................... 463/25; 463/27; 463/40; 463/42

(58) Field of Classification Search
CPC .............. G07F 17/3244; G07F 17/3258; G07F 17/3272; G07F 17/3274; A63F 13/10; A63F 13/12
USPC ........... 463/16, 20, 25, 26–29, 30, 31, 40–42, 463/11–13, 17–19, 43
See application file for complete search history.

(56) References Cited

U.S. PATENT DOCUMENTS 4,926,327 A 5/1990 Sidley
5,078,405 A 1/1992 Jones et al.
5,275,400 A 1/1994 Weingardt et al.
5,280,909 A 1/1994 Tracy
5,326,104 A 7/1994 Pease et al.
5,344,144 A 9/1994 Canon
5,511,781 A 4/1996 Wood et al.
5,542,669 A 8/1996 Charron et al.
5,564,700 A 10/1996 Celona
5,564,701 A 10/1996 Dettor
5,580,311 A 12/1996 Haste, III
5,584,485 A 12/1996 Jones et al.
5,611,535 A 3/1997 Tiberio
5,645,486 A 7/1997 Nagao et al.
5,655,961 A 8/1997 Acres et al.
5,702,304 A 12/1997 Acres et al.

(Continued)

FOREIGN PATENT DOCUMENTS

EP 1 175 928 1/2002
WO WO 00/32286 6/2000
WO WO 2005/015826 2/2005

*Primary Examiner* — David L Lewis
*Assistant Examiner* — Matthew D. Hoel
(74) *Attorney, Agent, or Firm* — Neal, Gerber & Eisenberg LLP

(57) ABSTRACT

A gaming system and method which forms, tracks and maintains one or more groups or teams. The gaming system and method also maintains at least one team progressive award. At any designated point in time, each group or team includes one or more players, wherein as a player plays one or more games at one or more gaming devices, the player accumulates or builds up equity in their current team or group. Upon a determination to provide a team progressive award to a player of a designated team, each eligible player actively associated with the designated team (i.e., each player actively belonging to the team) is provided a portion of the team progressive award. Each player's provided portion of the team progressive award is based on that player's relative accumulated equity in the designated team compared to each other eligible player's accumulated equity in the designated team.

25 Claims, 11 Drawing Sheets

U.S. PATENT DOCUMENTS

| | | | | |
|---|---|---|---|---|
| 5,741,183 | A | 4/1998 | Acres et al. | |
| 5,749,784 | A | 5/1998 | Clapper, Jr. | |
| 5,752,882 | A | 5/1998 | Acres et al. | |
| 5,766,076 | A | 6/1998 | Pease et al. | |
| 5,772,509 | A | 6/1998 | Weiss | |
| 5,779,547 | A | 7/1998 | SoRelle et al. | |
| 5,779,549 | A | 7/1998 | Walker et al. | |
| 5,816,918 | A | 10/1998 | Kelly et al. | |
| 5,820,459 | A | 10/1998 | Acres et al. | |
| 5,830,063 | A | 11/1998 | Brune | |
| 5,836,817 | A | 11/1998 | Acres et al. | |
| 5,851,149 | A | 12/1998 | Xidos et al. | |
| 5,855,515 | A | 1/1999 | Pease et al. | |
| 5,876,283 | A | 3/1999 | Parra et al. | |
| 5,876,284 | A | 3/1999 | Acres et al. | |
| 5,885,158 | A | 3/1999 | Torango et al. | |
| 5,890,963 | A | 4/1999 | Yen | |
| 5,947,820 | A | 9/1999 | Morro et al. | |
| 5,951,011 | A | 9/1999 | Potter et al. | |
| 5,957,775 | A | 9/1999 | Cherry | |
| 5,997,002 | A | 12/1999 | Goldman | |
| 6,001,016 | A | 12/1999 | Walker et al. | |
| 6,015,344 | A | 1/2000 | Kelly | |
| 6,039,648 | A | 3/2000 | Guinn et al. | |
| 6,056,289 | A | 5/2000 | Clapper, Jr. | |
| 6,065,752 | A | 5/2000 | Beltran | |
| 6,077,162 | A | 6/2000 | Weiss | |
| 6,089,980 | A | 7/2000 | Gauselmann | |
| 6,110,041 | A | 8/2000 | Walker et al. | |
| 6,142,872 | A * | 11/2000 | Walker et al. | 463/16 |
| 6,162,122 | A | 12/2000 | Acres et al. | |
| 6,165,071 | A | 12/2000 | Weiss | |
| 6,206,782 | B1 | 3/2001 | Walker et al. | |
| 6,210,275 | B1 | 4/2001 | Olsen | |
| 6,224,482 | B1 | 5/2001 | Bennett | |
| 6,231,445 | B1 | 5/2001 | Acres | |
| 6,241,608 | B1 | 6/2001 | Torango | |
| 6,244,958 | B1 | 6/2001 | Acres | |
| 6,254,483 | B1 | 7/2001 | Acres | |
| 6,257,981 | B1 | 7/2001 | Acres et al. | |
| 6,296,569 | B1 | 10/2001 | Congello, Jr. | |
| 6,311,976 | B1 | 11/2001 | Yoseloff et al. | |
| 6,312,332 | B1 | 11/2001 | Walker et al. | |
| 6,312,333 | B1 | 11/2001 | Acres | |
| 6,319,122 | B1 | 11/2001 | Packes, Jr. et al. | |
| 6,319,125 | B1 | 11/2001 | Acres | |
| 6,336,862 | B1 | 1/2002 | Brune | |
| 6,364,768 | B1 | 4/2002 | Acres et al. | |
| 6,371,852 | B1 | 4/2002 | Acres | |
| 6,375,567 | B1 | 4/2002 | Acres | |
| 6,375,568 | B1 | 4/2002 | Roffman et al. | |
| 6,375,569 | B1 | 4/2002 | Acres | |
| 6,431,983 | B2 | 8/2002 | Acres | |
| 6,435,511 | B1 | 8/2002 | Vancura et al. | |
| 6,503,146 | B2 | 1/2003 | Walker et al. | |
| 6,565,434 | B1 | 5/2003 | Acres | |
| 6,575,832 | B1 | 6/2003 | Manfredi et al. | |
| 6,592,459 | B2 | 7/2003 | Parra et al. | |
| 6,592,460 | B2 | 7/2003 | Torango | |
| 6,607,438 | B2 | 8/2003 | Baerlocher et al. | |
| 6,607,441 | B1 | 8/2003 | Acres | |
| 6,620,046 | B2 | 9/2003 | Rowe | |
| 6,626,758 | B1 | 9/2003 | Parham et al. | |
| 6,632,141 | B2 | 10/2003 | Webb et al. | |
| 6,648,753 | B1 | 11/2003 | Tracy et al. | |
| 6,652,378 | B2 | 11/2003 | Cannon et al. | |
| 6,656,047 | B1 | 12/2003 | Tarantino et al. | |
| 6,676,512 | B2 | 1/2004 | Fong et al. | |
| 6,692,354 | B2 | 2/2004 | Tracy et al. | |
| 6,709,330 | B1 | 3/2004 | Klein et al. | |
| 6,712,697 | B2 | 3/2004 | Acres | |
| 6,733,390 | B2 * | 5/2004 | Walker et al. | 463/23 |
| 6,749,510 | B2 | 6/2004 | Giobbi | |
| 6,755,420 | B2 | 6/2004 | Colton | |
| 6,758,748 | B2 | 7/2004 | Byrne | |
| 6,780,111 | B2 | 8/2004 | Cannon et al. | |
| 6,800,030 | B2 | 10/2004 | Acres | |
| 6,814,664 | B2 | 11/2004 | Baerlocher et al. | |
| 6,832,958 | B2 | 12/2004 | Acres et al. | |
| 6,835,132 | B2 | 12/2004 | Bennett | |
| 6,837,788 | B2 | 1/2005 | Cannon | |
| 6,837,793 | B2 | 1/2005 | McClintic | |
| 6,869,076 | B1 | 3/2005 | Moore et al. | |
| 6,887,154 | B1 | 5/2005 | Luciano, Jr. et al. | |
| 6,910,964 | B2 | 6/2005 | Acres | |
| RE38,812 | E | 10/2005 | Acres et al. | |
| 7,018,292 | B2 | 3/2006 | Tracy et al. | |
| 7,025,674 | B2 | 4/2006 | Adams et al. | |
| 7,040,982 | B1 | 5/2006 | Jarvis et al. | |
| 7,056,211 | B2 | 6/2006 | Taltavull et al. | |
| 7,077,746 | B2 | 7/2006 | Torango | |
| 7,097,562 | B2 | 8/2006 | Gagner | |
| 7,169,041 | B2 | 1/2007 | Tessmer et al. | |
| 7,297,059 | B2 | 11/2007 | Vancura et al. | |
| 2001/0055990 | A1 | 12/2001 | Acres | |
| 2002/0014821 | A1 | 2/2002 | Kobayashi et al. | |
| 2002/0052881 | A1 * | 5/2002 | Player | 707/104.1 |
| 2002/0138594 | A1 | 9/2002 | Rowe | |
| 2002/0151342 | A1 | 10/2002 | Tracy et al. | |
| 2002/0177483 | A1 | 11/2002 | Cannon | |
| 2002/0183105 | A1 | 12/2002 | Cannon et al. | |
| 2003/0027625 | A1 | 2/2003 | Rowe | |
| 2003/0036430 | A1 | 2/2003 | Cannon | |
| 2003/0242297 | | 2/2003 | Rowe | |
| 2003/0045350 | A1 | 3/2003 | Baerlocher et al. | |
| 2003/0060266 | A1 | 3/2003 | Baerlocher | |
| 2003/0060279 | A1 | 3/2003 | Torango | |
| 2003/0090063 | A1 | 5/2003 | Jarvis et al. | |
| 2003/0092484 | A1 | 5/2003 | Schneider et al. | |
| 2003/0104860 | A1 | 6/2003 | Cannon et al. | |
| 2003/0144965 | A1 | 7/2003 | Prasad et al. | |
| 2003/0186733 | A1 | 10/2003 | Wolf et al. | |
| 2003/0211880 | A1 | 11/2003 | Locke | |
| 2003/0222402 | A1 | 12/2003 | Olive | |
| 2003/0228904 | A1 | 12/2003 | Acres et al. | |
| 2003/0236116 | A1 | 12/2003 | Marks et al. | |
| 2004/0009811 | A1 | 1/2004 | Torango | |
| 2004/0072615 | A1 | 4/2004 | Maya et al. | |
| 2004/0204235 | A1 | 10/2004 | Walker et al. | |
| 2004/0242297 | A1 | 12/2004 | Walker | |
| 2005/0020340 | A1 | 1/2005 | Cannon | |
| 2005/0020342 | A1 | 1/2005 | Palmer et al. | |
| 2005/0026674 | A1 | 2/2005 | Wolf et al. | |
| 2005/0032573 | A1 | 2/2005 | Acres et al. | |
| 2005/0037845 | A1 | 2/2005 | Rozkin et al. | |
| 2005/0043088 | A1 | 2/2005 | Nguyen et al. | |
| 2005/0119047 | A1 | 6/2005 | Olive | |
| 2005/0143168 | A1 | 6/2005 | Torango | |
| 2005/0153767 | A1 | 7/2005 | Gauselmann | |
| 2005/0176488 | A1 | 8/2005 | Olive | |
| 2005/0209004 | A1 | 9/2005 | Torango | |
| 2005/0239542 | A1 | 10/2005 | Olsen | |
| 2006/0003829 | A1 | 1/2006 | Thomas | |
| 2006/0035705 | A1 | 2/2006 | Jordan | |
| 2006/0040723 | A1 * | 2/2006 | Baerlocher et al. | 463/16 |
| 2006/0040732 | A1 | 2/2006 | Baerlocher et al. | |
| 2006/0040733 | A1 | 2/2006 | Baerlocher et al. | |
| 2006/0040734 | A1 | 2/2006 | Baerlocher et al. | |
| 2006/0040736 | A1 | 2/2006 | Baerlocher et al. | |
| 2006/0046822 | A1 | 3/2006 | Kaminkow et al. | |
| 2006/0094495 | A1 | 5/2006 | Gelber et al. | |
| 2006/0217171 | A1 | 9/2006 | Roireau | |
| 2006/0217176 | A1 | 9/2006 | Walker et al. | |
| 2006/0217188 | A1 | 9/2006 | Walker et al. | |
| 2006/0240892 | A1 | 10/2006 | Walker et al. | |
| 2007/0010322 | A1 | 1/2007 | Walker et al. | |
| 2007/0015571 | A1 | 1/2007 | Walker et al. | |
| 2007/0054733 | A1 | 3/2007 | Baerlocher | |
| 2007/0087823 | A1 | 4/2007 | Walker et al. | |
| 2007/0093288 | A1 | 4/2007 | Walker et al. | |
| 2007/0105613 | A1 | 5/2007 | Adams et al. | |
| 2007/0155485 | A1 | 7/2007 | Cuddy et al. | |
| 2007/0167217 | A1 | 7/2007 | Kaminkow et al. | |
| 2007/0218975 | A1 | 9/2007 | Iddings et al. | |

* cited by examiner

FIG. 7

| Table | Probability | Lower Wager Limit | Upper Wager Limit | Average Hit Wager | Expected Increment |
|---|---|---|---|---|---|
| Quick | 30% | $20,000 | $500,000 | $260,000 | $598 |
| Medium | 45% | $100,000 | $3,000,000 | $1,550,000 | $3,565 |
| Large | 25% | $2,000,000 | $10,000,000 | $6,000,000 | $13,800 |
| Total | | $20,000 | $10,000,000 | $2,275,500 | $5,234 |

FIG. 8

| Wager | $20,000 | $260,000 | $1,550,000 | $2,275,500 | $6,000,000 | $10,000,000 |
|---|---|---|---|---|---|---|
| Expected Increment | $46 | $598 | $3,565 | $5,234 | $13,800 | $23,000 |
| **Number of Players** | **Lower Wager Limit** | **Quick Table Average Hit Wager** | **Medium Table Average Hit Wager** | **Total Table Average Hit Wager** | **Large Table Average Hit Wager** | **Upper Wager Limit** |
| 50 | 0.89 | 11.56 | 68.89 | 101.13 | 266.67 | 444.44 |
| 100 | 0.44 | 5.78 | 34.44 | 50.57 | 133.33 | 222.22 |
| 200 | 0.22 | 2.89 | 17.22 | 25.28 | 66.67 | 111.11 |
| 500 | 0.09 | 1.16 | 6.89 | 10.11 | 26.67 | 44.44 |
| 1000 | 0.04 | 0.58 | 3.44 | 5.06 | 13.33 | 22.22 |

***TIME (IN HOURS) FOR WAGERS TO REACH EACH SPECIFIED HIT VALUE***

FIG. 9

| Team #1 | Player's Total Coin-In for Team #1 | Player's Percentage of Total Coin-in for Team #1 | Player's Eligible Coin-in for Team #1 | Player's Percentage of Total Progressive Award | Player's Provided Portion of Team Progressive Award |
|---|---|---|---|---|---|
| Player A | $15,000 | 10.3% | $15,000 | 12.0% | $720 |
| Player B | $5,000 | 3.4% | $5,000 | 4.0% | $240 |
| Player C | $20,000 | 13.8% | $0 | 0.0% | $0 |
| Player D | $10,000 | 6.9% | $10,000 | 8.0% | $480 |
| Player E | $10,000 | 6.9% | $10,000 | 8.0% | $480 |
| Player F | $45,500 | 31.4% | $45,500 | 36.4% | $2,184 |
| Player G | $1,000 | 0.69% | $1,000 | 0.8% | $48 |
| Player H | $500 | 0.34% | $500 | 0.4% | $24 |
| Player I | $25,000 | 17.2% | $25,000 | 20.0% | $1,200 |
| Player J | $13,000 | 9% | $13,000 | 10.4% | $624 |
| TOTAL | $145,000 | 100% | $125,000 | 100% | $6,000 |

GAMING SYSTEM AND METHOD FOR PROVIDING TEAM PROGRESSIVE AWARDS

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager (e.g., the higher the wager, the higher the award). Symbols or symbol combinations which are less likely to occur usually provide higher awards.

In such known gaming machines, the amount of the wager made on the base game by the player may vary. For instance, the gaming machine may enable the player to wager a minimum number of credits, such as one credit (e.g., one cent, nickel, dime, quarter or dollar) up to a maximum number of credits, such as five credits. This wager may be made by the player a single time or multiple times in a single play of the primary game. For instance, a slot game may have one or more paylines and the slot game may enable the player to make a wager on each payline in a single play of the primary game. Thus, it is known that a gaming machine, such as a slot game, may enable players to make wagers of substantially different amounts on each play of the primary or base game ranging, for example, from one credit up to 125 credits (e.g., five credits on each of 25 separate paylines). This is also true for other wagering games, such as video draw poker, where players can wager one or more credits on each hand and where multiple hands can be played simultaneously. Accordingly, it should be appreciated that different players play at substantially different wagering amounts or levels and at substantially different rates of play.

Secondary or bonus games are also known in gaming machines. The secondary or bonus games usually provide an additional award to the player. Secondary or bonus games usually do not require an additional wager by the player to be activated. Secondary or bonus games are generally activated or triggered upon an occurrence of a designated triggering symbol or triggering symbol combination in the primary or base game. For instance, a bonus symbol occurring on the payline on the third reel of a three reel slot machine may trigger the secondary bonus game. When a secondary or bonus game is triggered, the gaming machines generally indicates this to the player through one or more visual and/or audio output devices, such as the reels, lights, speakers, video screens, etc. Part of the enjoyment and excitement of playing certain gaming machines is the occurrence or triggering of the secondary or bonus game (even before the player knows how much the bonus award will be).

Progressive awards associated with gaming machines are also known. In one form, a progressive award is an award amount which includes an initial amount and an additional amount funded through a portion of each wager made on the progressive gaming machine. For example, 0.1% of each wager placed on the primary game of a gaming machine may be allocated to the progressive award or progressive award fund. The progressive award grows in value as more players play the gaming machine and more portions of the players' wagers are allocated to the progressive award. When a player obtains a winning symbol or symbol combination which results in the progressive award, the accumulated progressive award is provided to the player. After the progressive award is provided to the player, the amount of the next progressive award is reset to the initial value and a portion of each subsequent wager is allocated to the next progressive award.

A progressive award may be associated with a single gaming machine or multiple gaming machines which each contribute portions of the progressive award. The multiple gaming machines may be in the same bank of machines, in the same casino or gaming establishment (usually through a local area network ("LAN")) or in two or more different casinos or gaming establishments (usually through a wide area network ("WAN")). Such progressive awards are sometimes called local area progressives ("LAP") and wide area progressives ("WAP"), respectively.

Moreover, a gaming machine or bank of gaming machines may be simultaneously associated with a plurality of progressive awards. In these multi-level progressive ("MLP") configurations, a plurality of progressive awards start at different award or value levels, such as $10, $100, $1000 and $10,000 and each individually increment or increase until provided to a player. Upon a suitable triggering event at one of more of the gaming devices associated with the MLP, one or more of the progressive awards which form the MLP are provided to one or more of the players at such gaming devices.

While such progressive awards are popular amongst players, a number of problems exist, such as only one person typically wins the progressive award. This may discourage the other players who have also been playing for a long period of time. Such discouragement can lead to players walking away with jackpot fatigue. Jackpot fatigue can occur when a player no longer finds an award desirable or worth the cost of continuing to play. This desire to quit playing is also due to the fact that a player may feel they must wait a substantial period of time for the jackpot to climb back to a high value. That is, when a progressive award is provided at a different gaming machine, a player may feel deflated and not wish to continue playing for a base or reset level progressive award.

There is a continuing need to provide new and different gaming machines and gaming systems with one or more progressive awards.

SUMMARY

In one embodiment, the gaming system and method disclosed herein forms, tracks and maintains one or more groups or teams. The gaming system and method disclosed herein also maintains at least one team progressive award. Each group or team includes one or more players (i.e. team members), wherein as a player plays one or more games at one or more gaming devices, the player accumulates or builds up equity in their current team or group. Upon a determination to provide a team progressive award to a player of a designated team or group, each eligible player actively associated with the designated team or group (i.e., each player actively belonging to the team) is provided a portion of the team progressive award. In one such embodiment, each player's provided portion of the team progressive award is based on that player's relative accumulated equity in the designated team or group compared to each other eligible player's accumulated equity in the designated team or group.

In one embodiment, the gaming system and method disclosed herein enables a player to be actively associated with or actively belong to (and thus accumulating equity in) one team or group at any given time. The gaming system further enables a player to also be inactively associated with or passively belong to (and thus not accumulating equity in) a plurality of teams or groups at any given or designated time. In this embodiment, the gaming system enables a player to switch from being actively associated with and accumulating equity in a first team to being actively associated with and accumulating equity in a second team (and no longer actively associated with and accumulating equity in the first team). In one such embodiment, if a player switches from actively belonging to a first team to actively belonging to a second team, the gaming system retains for the player any accumulated or built up equity in the first team as the player accumulates or builds up equity in the second team.

In one embodiment of the gaming system and method disclosed herein, to win a portion of a team progressive award (which is determined to be provided to the members of a designated team or group), a player must be actively associated or actively belong to that designated team or group. That is, if a determination occurs to provide a team progressive award to at least one player actively associated with a first team and a player with accumulated equity in the first team is actively associated with a different, second team (and has not switched back to being actively associated with the first team during any provided redemption period), that player's accumulated equity in the first team will be forfeited and that player is deemed ineligible for the team progressive award. Thus, the player will not win any portion of the provided team progressive award. Such a configuration provides that an active player's relative proportion or share of a team progressive award will often be larger than the player's accumulated or built up equity in the team provided the team progressive award because a number of the players with accumulated equity in the team will not be actively associated with the team and thus will not claim their relative proportion or share of the team progressive award.

In one embodiment, the gaming system disclosed herein includes a central server, central controller or remote host in communication with or linked to a plurality of gaming machines or gaming devices. In one such embodiment, the gaming system maintains a separate team progressive award for each group or team. In this embodiment, if a player is actively associated with a team, a percentage of that player's wagers placed or coin-in increment or fund the team progressive award associated with that team. In another such embodiment, the quantity of team progressive awards is less than the quantity of teams, wherein a plurality of teams compete for a team progressive award. In this embodiment, if a player is actively associated with a team, a percentage of that player's wagers placed or coin-in increment or fund the team progressive award which the player's current team is competing against other teams to win. In one embodiment, a percentage of a player's wagers placed or coin-in increment or fund a current team progressive award and a percentage of the player's wagers placed or coin-in are allotted to offset the reset value or initial start amount of one or more additional team progressive awards.

In one embodiment, in addition to maintaining one or more team progressive awards, the gaming system and method disclosed herein forms, tracks and maintains one or more groups or teams of players. At a designated point in time, each group or team includes zero, one or more eligible players (i.e., players actively associated with or actively belonging to the team) and zero, one or more ineligible players (players inactively associated or passively belonging to the team). In one such embodiment, the gaming system forms, tracks and maintains at least one default group or team and enables one or more of the players at the gaming devices to join the default group or team. In another embodiment, the gaming system forms, tracks and maintains a plurality of groups or teams and enables each player the opportunity to select which of the groups or teams to join. In another embodiment, the gaming system enables one or more players to form their own group or team and selectively invite other players to join this group or team which is maintained by the gaming system. In different embodiments, a player is enabled to set up a team or group via the gaming device, a device connected to a data network, such as the internet, a player tracking device, a service window, or a kiosk. It should be appreciated that any suitable manner of creating teams and determining which players belong to which teams may be implemented in accordance with the gaming system disclosed herein.

In one embodiment, the gaming system enables a player to concurrently belong to or be associated with a plurality of teams or groups at the same time. In this embodiment, the gaming system enables a player, at any given time, to be actively associated with or actively belong to one team or group (i.e., the player is eligible to win a team progressive award with the other members of the team) and also inactively associated with or passively belong to one or more additional teams or groups (i.e., the player is ineligible to win a team progressive award with the other members of the team). For example, at a designated point in time, a first player may be actively associated with a first team or group (and thus be eligible to win a team progressive award provided to the eligible members of the first team), inactively associated with a second team or group (and thus be ineligible to win a team progressive award provided to the eligible members of the second team) and inactively associated with a third team or group (and thus be ineligible to win a team progressive award provided to the eligible members of the third team).

In one embodiment, the gaming system enables a player to switch teams at any time to accumulate or build up equity in the new team as described below. In one such embodiment, the gaming system enables a player to hold accumulated equity in a plurality of teams or groups at any given time. That is, if a player switches from actively belonging to a first team to actively belonging to a second team, the player retains any built up equity in the first team, while they accumulate or build up equity in the second team. In these embodiments, a player actively belongs to or is actively associated with a team by joining or switching to that team (without switching to another team) and a player passively belongs to or is passively associated with a team by previously accumulating equity in that team, even though the player is not currently building equity in that team.

It should be appreciated that this configuration of enabling players to switch amongst multiple teams invokes an element of player strategy as a player must choose between building equity in one team (and thus having a larger share of a team progressive award if the player is one the eligible members of this one team which are provided a team progressive award) or spreading their equity around amongst a plurality of teams (and thus having a smaller stake of a number of team progressive awards if the player is one of the eligible members of these teams which are provided team progressive awards). This configuration further invokes an element of player strategy as a player must choose between building equity in a team with a large number of members (and thus having a smaller relative amount of equity in the team and thus a smaller share of a team progressive award which may potentially grow to a large value based on the large number of members) or building equity in a team with a small number of members (and thus having a larger relative amount of equity in the team and thus a larger share of a potentially smaller team progressive award).

In operation of one embodiment of the gaming system and method disclosed herein, if a player actively belongs to a team or group, then for each occurrence of an equity accumulation event associated with that player (or the gaming device which that player is currently playing), the player accumulates or otherwise builds equity in that team or group. In one such embodiment, a player builds equity in a team or group in the form of equity accumulation units associated with that team or group. In one embodiment, the gaming system tracks the occurrences of one or more suitable events occurring at or in association with the player and/or the player's currently played gaming device and determines, based on these tracked events, whether an equity accumulation event has occurred. In one such embodiment, the gaming system defines one or more game play parameters, wherein each time a player's tracked game play activity satisfies the defined parameter, an equity accumulation event occurs. In one such embodiment, an equity accumulation event occurs for a specific player based on that player's wagering activity. In different embodiments, upon the specific player wagering a designated amount of coin-in at one or more of the gaming devices in the gaming system or upon the specific player's current gaming device providing a designated amount of coin-out to the player, the central sever causes an equity accumulation event to occur and causes the player to accumulate equity in their current team or group. This embodiment provides that a player who wagers more and/or plays more will have a greater amount of accumulated equity in a team than a player who wagers less and/or plays less. In different embodiments, an equity accumulation occurs and a player accumulates equity in a group based on one or more different factors such as, but not limited to, a number of games played, an amount wagered per game, a total amount waged during one or more designated time periods, one or more amounts of time played, one or more primary or base game events or outcomes generated, one or more secondary or bonus game events or outcomes generated, one or more events associated with a player's status (determined through a suitable player tracking system), one or more random determinations, one or more side wagers placed, a game type played, and a player's non-game play history.

In one embodiment, upon an occurrence of an equity accumulation event for a player, the gaming system determines an amount of equity in the player's current team to provide to the player. In one embodiment, the amount of equity to provide to the player is based on one or more factors, such as the number of other player's accumulating equity in the team, the amount of equity previously provided in the team, the player's status (such as determined through a player tracking system), the player's primary game wager, time (such as the time of day), an amount of coin-in accumulated in one or more pools, and/or one or more side wagers placed. In different embodiments, the amount of equity in the player's current team to provide to the player is predetermined, randomly determined, determined based on a generated symbol or symbol combination, determined based on a random determination by the central controller, determined based on a random determination at the gaming machine, or determined based on any other suitable method or criteria.

In one embodiment, the gaming system displays to each player their minimum accumulated equity in one or more teams, their relative amount of minimum accumulated equity in one or more teams and/or the team progressive awards played for or associated with each team the player has accumulated equity. That is, the gaming system displays any suitable information to the player to convey to the player that as the player continues to play for a team, the player's relative equity stake in the team may increase because certain other players stop playing in association with the team and thus stop accumulating equity in the team. In different embodiments, the gaming system displays to a player any suitable information regarding their team(s) and their gaming experience via the gaming device, a device connected to a data network, such as the internet, a player tracking device, a service window, or a kiosk.

In one embodiment, the gaming system continues enabling players to accumulate equity in one or more teams or groups until a team progressive award triggering event occurs at or in association with a player or a gaming device in the gaming system. In this embodiment, if a team progressive award triggering event occurs at or in association with a player or a gaming device in the gaming system, the eligible members of the team or group (which the player associated with the occurred team progressive award triggering event actively belonged to) are provided a team progressive award. In one embodiment, the team progressive award triggering event occurs based on any tracked occurrences of one or more suitable events occurring at or in association with one or more players and/or one or more gaming devices in the gaming system. In one such embodiment, the team progressive award triggering event occurs based on a displayed event in a play of one or more games of one or more of the gaming devices in the gaming system. In another such embodiment, the team progressive award triggering event occurs independent of any displayed event in any play of any game of any of the gaming devices in the gaming system. In one such embodiment, the team progressive award triggering event occurs based on time, such as at a certain time of a certain day.

In one embodiment wherein each team or group is associated with a separate progressive award, upon the occurrence of a team progressive award triggering event, the gaming system determines which players actively belong to the team or group associated with the team progressive award to be provided. In another embodiment wherein a plurality of teams compete for a team progressive award, upon the occurrence of a team progressive award triggering event for a player, the gaming system determines which team that player actively belongs to and provides the eligible players of that team the team progressive award. In one embodiment, the gaming system provides a designated redemption period for players who passively belong to the team (i.e., players who have accumulated equity in the team but do not currently actively belong to the team) to switch back to actively belong to the team or group. In one such embodiment, this redemption period is a length of time which enables players to play one or more games and then return to actively belong to the team or group to claim their share of the provided team progressive award.

In one embodiment, after determining which players actively belong to the team or group determined to be provided the team progressive award (i.e., which players are eligible to win part of the provided team progressive award), the gaming system determines each eligible player's share or portion of the team progressive award. In this embodiment, each player's share or portion of the team progressive award is based on that player's relative amount of accumulated equity in the team or group compared to each other eligible player's amount of accumulated equity in the team or group. It should be appreciated that as the quantity of players that actively belong to a team or group (after the team progressive award triggering event and any redemption period thereafter) is often less than the quantity of players that accumulated equity in the team or group, each player's relative proportion or share of a team progressive award will often be larger than the player's built up equity in the team provided the progressive award. That is, such players that do not actively belong to a team to claim their relative proportion or share of the team progressive award (even though such players previously accumulated equity in the team) will forfeit their share of the team progressive award and this forfeited share will be distributed amongst the remaining eligible members of the team.

In one such embodiment, if an amount of accumulated equity for a player is based on their amounts wagered or coin-in, then a player's portion of the team progressive award will be a percentage of the coin-in that player contributed compared to the total coin-in of all eligible team members (i.e., players that actively belong to the team). For example, if a team or group is associated with fifty registered players who have accumulated equity in the team, but at the time the team progressive award triggering event occurs (and any redemption period thereafter), only twenty-five players actively belong to the team, then the team progressive award triggering event will be shared amongst the twenty-five eligible players. In this example, if the coin-in or wagers placed from each of the twenty-five players account for $150,000 of the wagers or coin-in placed for the team, then each player's equity share or portion of the team progressive award is based on that player's total coin-in toward the team progressive award divided by $150,000. It should be appreciated that in these embodiments, although a player accumulates equity in a team or group over a period of time, the player's equity share or portion of the team progressive award is determined when the gaming system determines which players to provide a portion of the team progressive award (i.e., after the team progressive award triggering event and any redemption period thereafter).

Accordingly, an advantage of the gaming system and method disclosed herein is to enable players to work together as a team and share in a progressive award in an equitable manner. Such team concept enable players to feel in control as the join or create teams with friends and family (or with new friends) and share in the joy of winning together. The team contributions further enable for relatively large jackpots to be provided to players of these teams or groups.

Additional features and advantages are described in, and will be apparent from, the following Detailed Description and the figures.

BRIEF DESCRIPTION OF THE FIGURES

FIGS. 7 and 8 are charts of examples of the different hit properties associated with different team progressive awards.

FIG. 9 is a chart of an example of each eligible players portion of a team progressive award.

DETAILED DESCRIPTION

The present disclosure may be implemented in various configurations for gaming machines, gaming devices or gaming systems, including but not limited to: (1) a dedicated gaming machine, gaming device or gaming system wherein the computerized instructions for controlling any games (which are provided by the gaming machine or gaming device) are provided with the gaming machine or gaming device prior to delivery to a gaming establishment; and (2) a changeable gaming machine, gaming device or gaming system where the computerized instructions for controlling any games (which are provided by the gaming machine or gaming device) are downloadable to the gaming machine or gaming device through a data network when the gaming machine or gaming device is in a gaming establishment. In one embodiment, the computerized instructions for controlling any games are executed by at least one central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
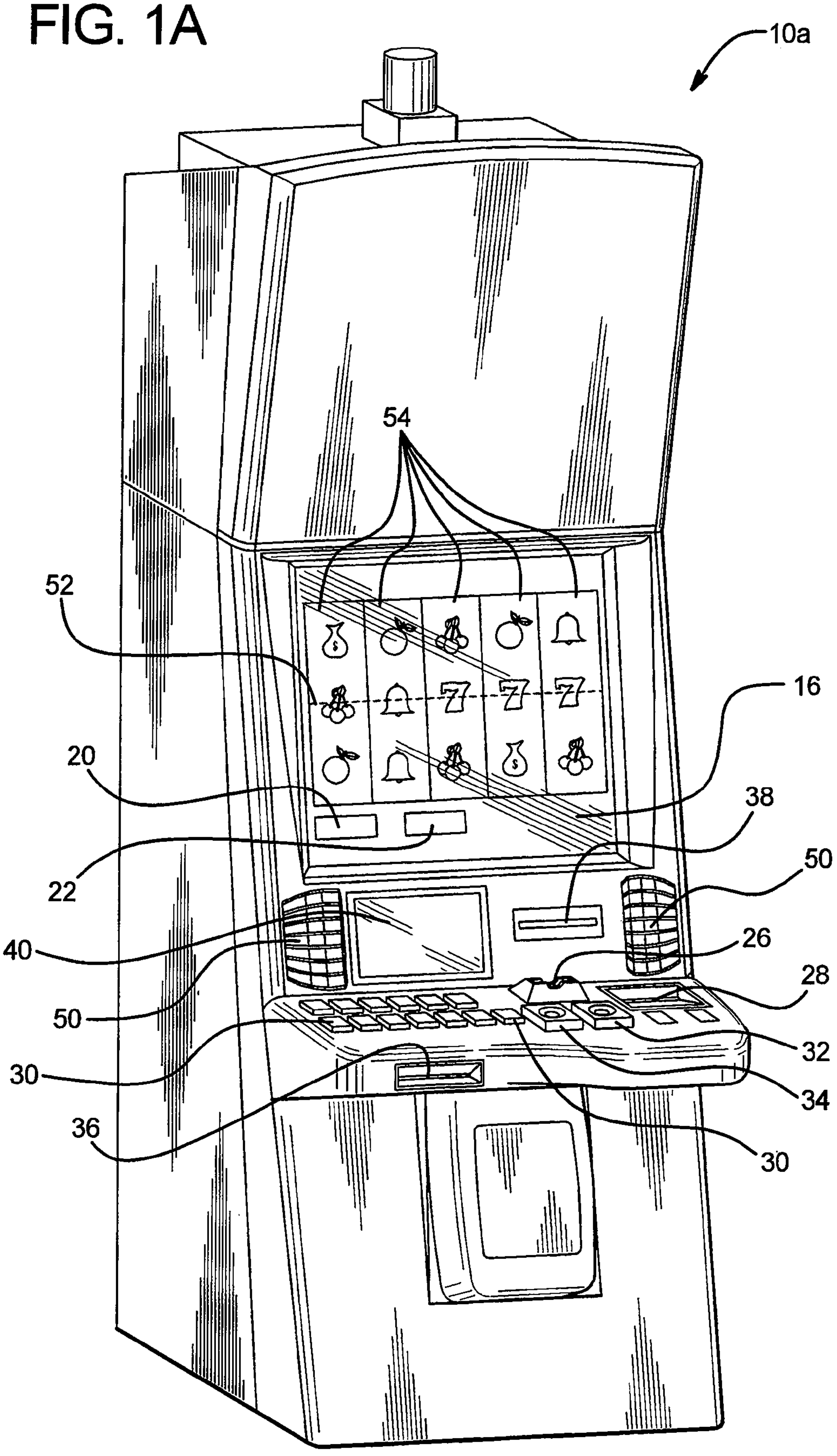
FIG. 1A is a front-side perspective view of one embodiment of the gaming device disclosed herein.
Figure 1B:
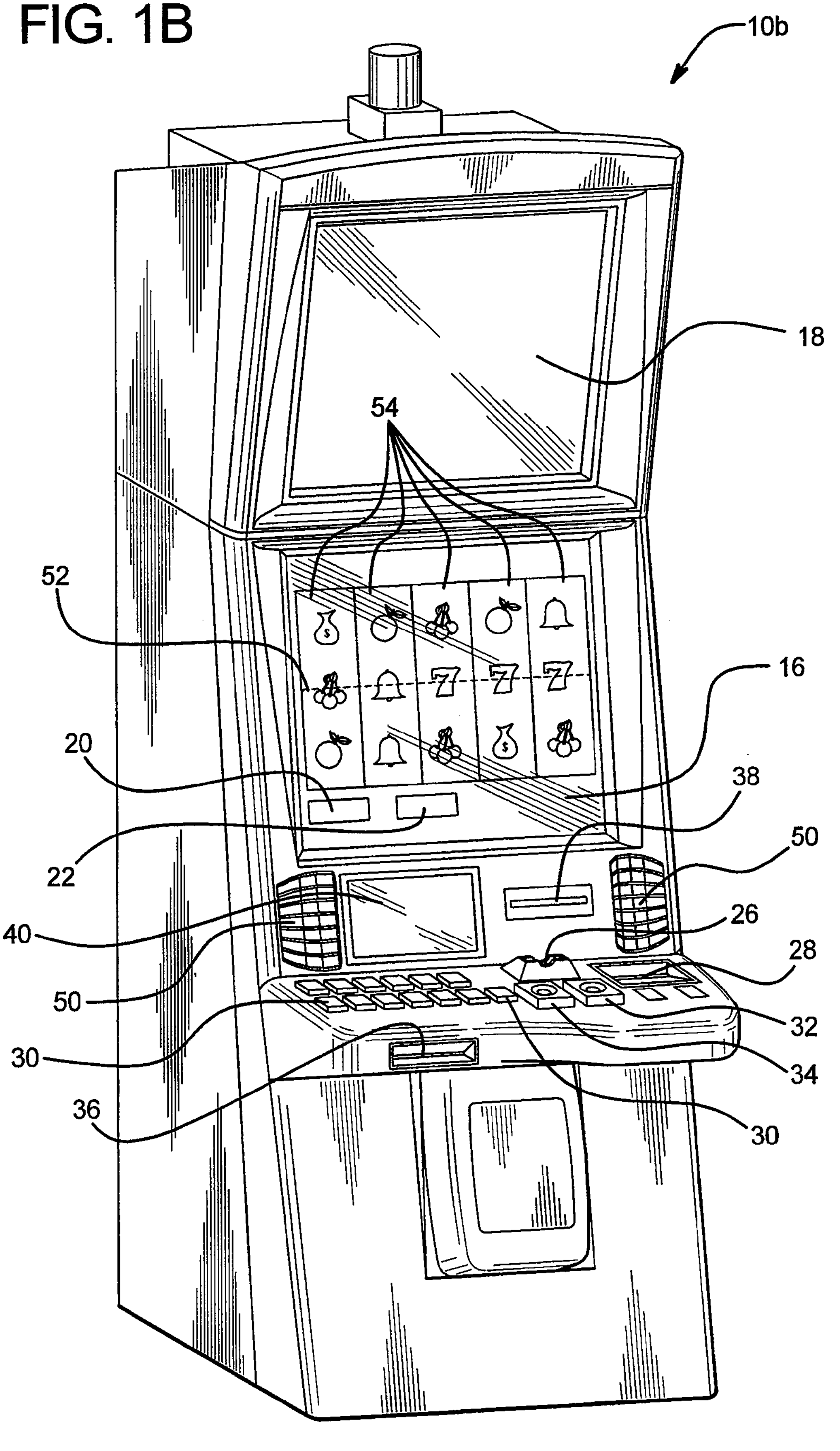
FIG. 1B is a front-side perspective view of another embodiment of the gaming device disclosed herein.

Referring now to the drawings, two example alternative embodiments of the gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
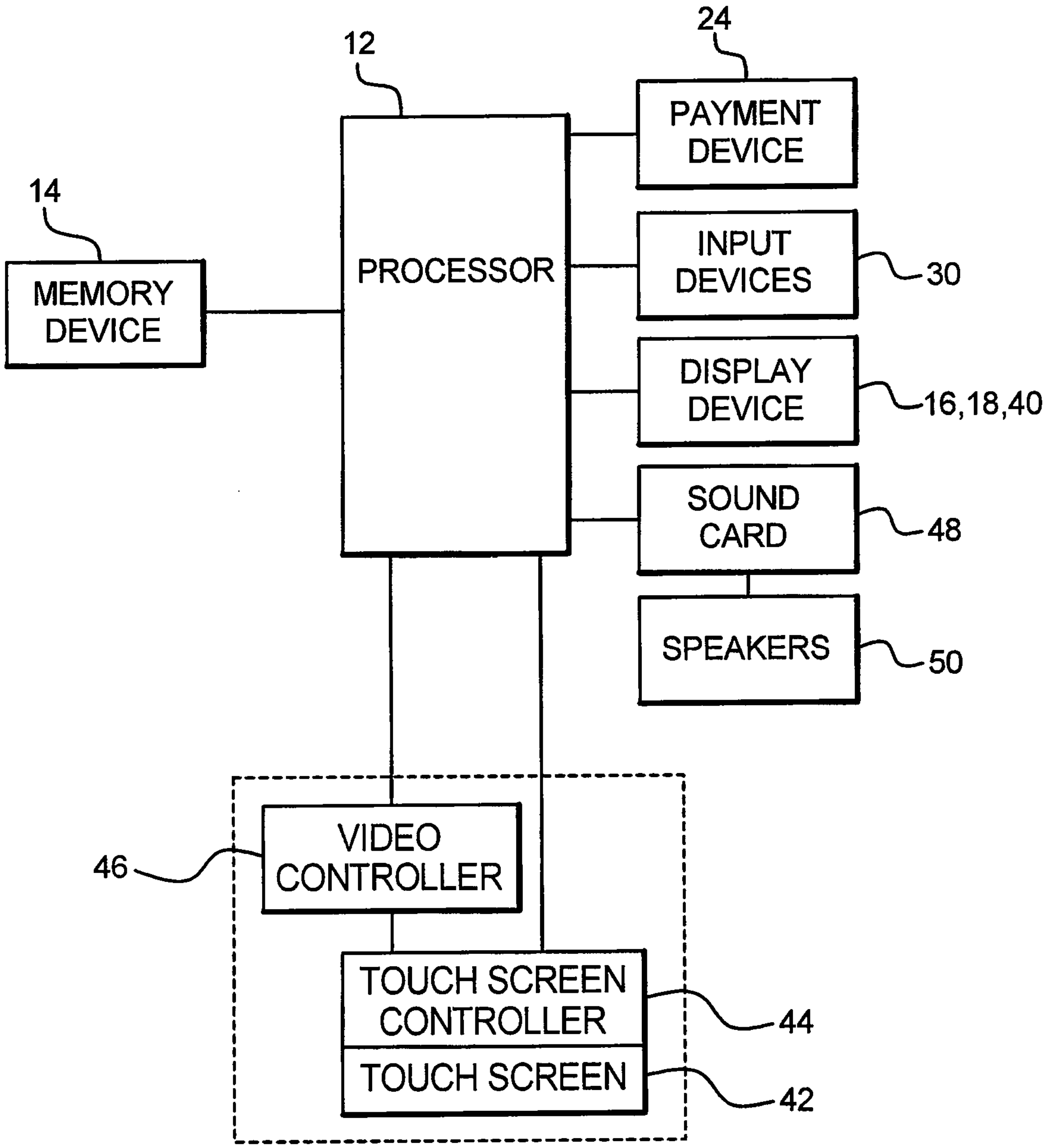
FIG. 2A is a schematic block diagram of the electronic configuration of one embodiment of the gaming device disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM), which can include non-volatile RAM (NVRAM), magnetic RAM (MRAM), ferroelectric RAM (FeRAM) and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. In other embodiments, part or all of the program code and/or operating data described above can be downloaded to the memory device through a suitable network.

In one embodiment, an operator or a player can use such a removable memory device in a desktop computer, a laptop personal computer, a personal digital assistant (PDA), portable computing device, or other computerized platform to implement the present disclosure. In one embodiment, the gaming device or gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance or the equivalent. In one embodiment, the gaming device includes a bet display 22 which displays a player's amount wagered. In one embodiment, as described in more detail below, the gaming device includes a player tracking display 40 which displays information regarding a player's playing tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card may be implemented in accordance with the gaming device disclosed herein.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places. One such input device is a conventional touch-screen button panel.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

The gaming system disclosed herein can incorporate any suitable wagering primary or base game. The gaming machine, gaming device, gaming system or gaming table may include some or all of the features of conventional gaming machines or gaming tables. The primary or base game may comprise any suitable reel-type game, card game, cascading or falling symbol game, number game or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, display the plurality of simulated video reels 54. Each reel 54 displays a plurality of indicia or symbols, such as bells, hearts, fruits, numbers, letters, bars or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device with wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels, modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more or each of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one or a plurality of the selectable indicia or numbers via an input device such as the touch screen. The gaming device then displays a series of drawn numbers to determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition may be by exceeding a certain amount of game play (such as number of games, number of credits, amount of time), or reaching a specified number of points earned during game play.

In another embodiment, the gaming device processor 12 or central server 56 randomly provides the player one or more plays of one or more secondary games. In one such embodiment, the gaming device does not provide any apparent reasons to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game is accomplished through a simple "buy in" by the player, for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
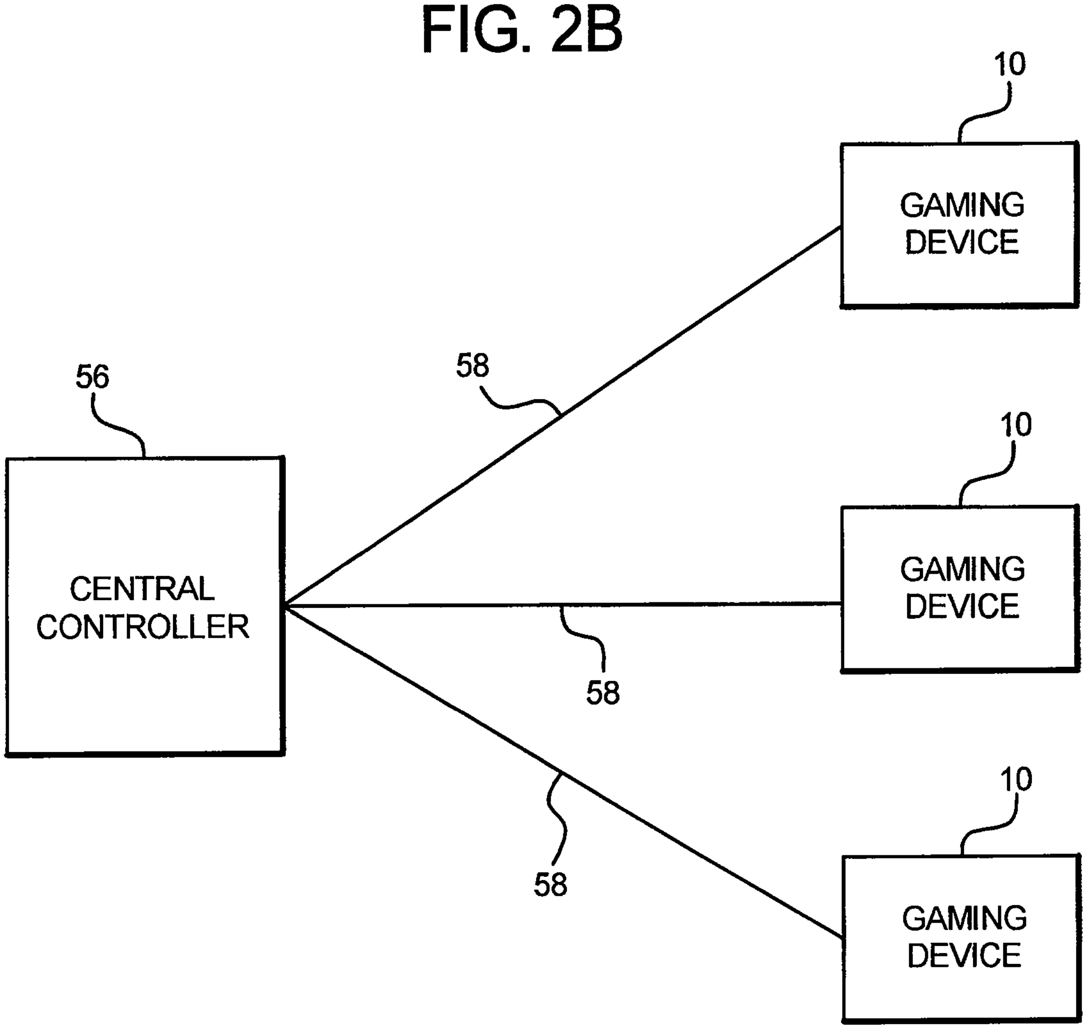
FIG. 2B is a schematic block diagram illustrating a plurality of gaming terminals in communication with a central controller.

In one embodiment, as illustrated in FIG. 2B, one or more of the gaming devices 10 are in communication with each other and/or at least one central server, central controller or remote host 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands or any other suitable data or signal between the individual gaming device and the central server. The gaming device processor is operable to execute such communicated events, messages or commands in conjunction with the operation of the gaming device. Moreover, the processor of the central server is designed to transmit and receive events, messages, commands or any other suitable data or signal between the central server and each of the individual gaming devices. The central server processor is operable to execute such communicated events, messages or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming devices based on the results of a bingo, keno or lottery game. In this embodiment, each individual gaming device utilizes one or more bingo, keno or lottery games to determine the predetermined game outcome value provided to the player for the interactive game played at that gaming device. In one embodiment, the bingo, keno or lottery game is displayed to the player. In another embodiment, the bingo, keno or lottery game is not displayed to the player, but the results of the bingo, keno or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of if the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any players gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the gaming system disclosed herein is implemented via a data network, such as an internet or intranet. In one such embodiment, the operation of a gaming device can be viewed at the gaming device with at least one internet browser. In another such embodiment, the operation of a gaming device can be viewed at a location remote from the gaming device or gaming establishment utilizing at least one internet browser. In these embodiments, operation of the gaming device may be accomplished with only a connection to the central server or controller (i.e., an internet/intranet server) through a conventional phone or other data transmission line, digital subscriber line (DSL), T-1 line, coaxial cable, fiber optic cable, or other suitable connection. Accordingly, players may access an internet game page from any location where an internet connection and computer, or other internet facilitator is available. It should be appreciated that the expansion in the number of computers and number and speed of internet connections in recent years increases opportunities for players to play from an ever-increasing number of remote sites. It should be further appreciated that enhanced bandwidth of digital wireless communications may render such technology suitable for some or all communications, particularly if such communications are encrypted. Higher data transmission speeds may be useful for enhancing the sophistication and response of the display and interaction with the player.

In one embodiment, the central server (i.e., an internet/intranet server) maintains at least one dedicated gaming site which is associated with one or more progressive awards and one or more supplemental funds as disclosed herein. In operation, a player logs onto the dedicated gaming site and the central server enables the player to wager on and participate in one or more online games at this gaming site. In this embodiment, upon the occurrence of any progressive award increase event, the central server adds a value or amount (from the maintained supplemental fund) to one or more of the progressive awards associated with the dedicated gaming site.

In one embodiment, to regulate and monitor the play of games over the internet, player's identifications are verified through credit card authentication. Through this authentication, the gaming system verifies the player, the player's age, the player's location and any other suitable information associated with the player. In one such embodiment, the gaming system utilizes the verified location information to monitor and ensure that the player in a certain location follows any applicable gaming regulations associated with that location. In another such embodiment, the gaming system utilizes the verified location information to set up different progressive awards for different regions. In this embodiment, different progressive awards are allotted per region.

In another embodiment including game play over the internet, the gaming system stores information about one or more players. In this embodiment, after a player has enrolled or identified themselves with the gaming system (via the dedicated gaming site), the gaming system stores their information, such as credit card information, preferred options, player number, name, or any other information in a database. In one such embodiment, the gaming system enables the player to set and store one or more gaming options, such as jackpot betting, side wagering, and preferred games, associated with the dedicated gaming site.

As mentioned above, in one embodiment, the present disclosure may be employed in a server based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In one embodiment, a plurality of gaming devices at one or more gaming sites are networked to the central server in a progressive configuration, wherein a portion of each wager placed is allocated to one or more progressive awards. In one embodiment, such progressive awards are associated with the system of gaming machines which each contribute portions of the progressive awards. In one such embodiment, different progressive awards are associated with different numbers of gaming devices. For example, a progressive award valued at $10,000 may be associated with ten gaming devices while another progressive award valued at $500,000 may be associated with one-hundred gaming devices. In one embodiment, the multiple gaming machines may be in the same bank of machines, in the same casino or gaming establishment such as through a LAN or in two or more different casinos or gaming establishments such as through a WAN. In another embodiment, each individual gaming machine maintains one or more progressive awards wherein a portion of each wager placed at that respective gaming machine is allocated to one or more progressive awards maintained by such individual gaming machine. In another embodiment, each individual gaming machine maintains one or more progressive awards and the central server simultaneously or substantially simultaneously maintains one or more progressive awards. In one such embodiment, the lower valued, more frequently triggered progressive awards are maintained by the individual gaming machines and the higher valued, less frequently triggered progressive awards are maintained by the central server.

In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state. In one embodiment, the host site computer is maintained for the overall operation and control of the system. In this embodiment, a host site computer oversees all or part of the progressive gaming system and is the master for computing all or part of the progressive jackpots. All participating gaming sites report to, and receive information from, the host site computer. Each central server computer is responsible for all data communication between the gaming device hardware and software and the host site computer.

In one embodiment, more than one of the progressive awards start at the same level, such as $1000 and increment or increase until provided to a player. In another embodiment, more than one of the progressive awards start at different levels such as $10, $100, $1000 and $10,000 and increment or increase until provided to a player. The progressive awards accumulate based on a small percentage (such as 0.1%) of coin-in or wagered amounts in a conventional manner. In one embodiment, the percentage that goes to each progressive award is equal (such as 0.1% to each of four progressive awards). At this accrual rate, player wagers totaling $1,000,000 are required for the progressive to reach $1000. In one embodiment, at least a fraction of this amount may be funded by the casino by using a starting value higher than zero to make the progressive awards attractive even after they are reset. In other embodiments, two or more of the progressive awards may be funded by different percentages. In these embodiments, the central server and/or individual gaming device processor continues to increase the progressive levels until a progressive award is provided to a player (upon the occurrence of a progressive award triggering event), at which point the progressive is reset and another progressive award starts incrementing from the appropriate default progressive award level. In another embodiment, one or more progressive awards increment a predetermined amount per game played. In one such embodiment, this incremental amount is partially funded by an amount of the wagers placed and is partially funded by an amount provided by a gaming establishment marketing or advertisement department. In different embodiments, the gaming establishment marketing or advertisement department provides a value or amount to the progressive award based on matching a percentage of wagers placed, a predetermined amount for each game played, an elapsed period of time, or any other suitable manner.

In another embodiment, two or more of the progressive awards may be funded at different temporal rates. In this embodiment, the different progressive awards are incremented or funded in different increments of time wherein until the progressive hits, a set amount is added to the progressive at each determined time increment. In another embodiment, two or more of the progressive awards may each be incremented or funded based on different incrementing factors or incrementors. In this embodiment, a first of the progressive awards may increment each time a first incrementing factor occurs and a second of the progressive awards may increment each time a second incrementing factor occurs, wherein the first incrementing factor and the second incrementing factor are different. Examples of incrementing factors could be a symbol-driven trigger in the base game, the player betting a maximum amount, a percentage of possible gaming machines being actively played or in active status, or any other suitable method for defining an incrementor.

In one embodiment, one or more of the progressive awards are funded, at least partially, via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed. In another embodiment, one or more progressive awards are funded, at least partially, via an amount provided by one or more marketing and/or advertising departments, such as a casino's marketing department.

In one alternative embodiment, a minimum wager level is required for a gaming machine to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In one embodiment, the central server or other central controller determines when one or more progressive award wins are triggered. In this embodiment, a central controller and an individual gaming machine work in conjunction with each other to determine when a progressive award win is triggered, for example through an individual gaming machine meeting a predetermined requirement or criteria established by the central controller. In another embodiment, an individual gaming machine may determine when one or more progressive award wins are triggered. In another embodiment, an individual gaming machine may determine when at least one progressive award win is triggered and the central controller determines when at least one progressive award win is triggered.

In one embodiment, different gaming devices in the gaming system have different progressive awards available to a player. In one such embodiment, different types of gaming devices are associated with different types of progressive awards based on the current configuration of the gaming system. In one embodiment, zero, one or more progressive awards may be associated with each of the gaming devices in the gaming system while zero, one or more different progressive awards may be associated with a plurality of, but not all of the gaming devices in the gaming system.

In one embodiment, at least one and preferably a plurality of the progressive awards maintained by the gaming system are provided to players of the linked gaming machines in an apparently random fashion as perceived by the players of these gaming machines. These progressive awards are distinguished from the awards that the gaming machines provide to the players for displayed winning outcomes in the plays of the primary wagering games, such as slot games, card games (e.g., poker, blackjack) or any other suitable game.

In one embodiment, the gaming devices do not provide any apparent reasons to the players for obtaining such progressive awards. In this embodiment, providing the progressive awards is not triggered by a displayed event in the primary game or based specifically on any of the displayed plays of any primary game or on any of the displayed plays of any secondary game of the gaming machines in the system. That is, these progressive awards are provided to the players without any explanation or alternatively with simple explanations.

In another embodiment, a plurality of players at a plurality of linked gaming devices in a gaming system participate in a group gaming environment. In one embodiment, a plurality of players at a plurality of linked gaming devices work in conjunction with one another, such as playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

In another embodiment, a gaming device, gaming machine or gaming system disclosed herein includes an intelligent gaming table or wagering chip tracking system. In one such embodiment, the intelligent gaming table enables one or more players to play one or more suitable games by placing one or more wagers utilizing wagering chips. Such game play and/or wagering information is tracked by the intelligent gaming table (utilizing any suitable chip identification devices) and may be provided to the central server, central controller or remote host. It should be appreciated that any suitable embodiments disclosed herein may be implemented in association with the intelligent gaming table. That is, any function, task or action executed at, by or otherwise in association with any gaming device and/or any central server disclosed herein may also be executed at, by or otherwise in association with one or more intelligent gaming tables.

In one embodiment, a gaming table includes a suitable support structure, such as one or more legs, a playing surface and a dealer position. In one embodiment, the intelligent gaming table is a conventional gaming table wherein any chip identification devices are not directly integrated or situated in or on the gaming tables. In one such embodiment, chip identification devices are located at, above or below the table. In another such embodiment, the chip identification devices are attached to the gaming table or adjacent to the gaming table. In another embodiment, the chip identification devices are included in the gaming table.

In one embodiment, the dealer position includes one or more different chip trays for holding several stacks of the dealer's chips. The dealer may use the chip trays to collect and store wagering chips, or to make change for a player. The gaming table includes a plurality of player stations or seats, such as five player stations or seats. It should be appreciated that the gaming table may accommodate any suitable number of player positions and players so as not to interfere with game play. In one embodiment, the gaming table includes one or more chip holding areas where the players hold their chips. In certain embodiment, the gaming tables include wagering areas where players place their bets. It should be appreciated that the gaming table may also include a community wagering area where each of the players place their wagers. In one embodiment, the gaming table also includes a plurality of playing areas associated with each of the player stations.

In one embodiment, games played at the gaming tables may include any suitable card game or any suitable non-card game, such as roulette and craps. The gaming table is operable to include any suitable apparatuses or components of the games. It should be appreciated that different gaming tables may include the same game components or different game components.

The intelligent table system disclosed herein is operable to use a variety of types of technology to track player activity. The intelligent table system disclosed herein may include any suitable components or devices to monitor the player's gaming activity. That is, the intelligent table systems tracks how much a player wagers or how many chips a player wagers, how much a player has won or lost, how many chips the player has on the gaming table, or any other desired tracking information. In one embodiment, the intelligent table system also tracks this information for each and every game played by the player. It should be appreciated that the intelligent table system may include any suitable gaming table areas with chip identification devices, any suitable method of identifying the wagering chips, and may use any suitable chip reading technology.

In one embodiment, the intelligent table system is operable to include one or more chip and/or playing card identifying devices. In one embodiment, the intelligent table system uses Infra-red signals received from table game chips and/or playing cards to track activity. In another embodiment, the intelligent table system employs radio frequency identification (RFID) to track chip or playing card activity. The RFID is a system that uses a small electronic device that includes a small chip and an antenna. The chips and/or playing cards are scanned at the gaming table to retrieve the identifying information. In another embodiment, the gaming table disclosed herein uses optical technology. The gaming table disclosed herein may use any suitable other chip and/or playing card identification devices, which may use any suitable chip and/or playing card identification technology, to determine player gaming table wagering activities.

In another embodiment, the intelligent gaming table disclosed herein employs a virtual gaming table. The virtual gaming table provide virtual playing cards and/or virtual wagering chips which enable one or more players to play one or more games at the intelligent gaming table. In one embodiment, such virtual gaming tables can utilize one or more surface computing mechanisms, one or more cameras and one or more of a plurality of display devices to provide these games. In one such embodiment, an intelligent gaming table includes an acrylic top and employs a plurality of infrared cameras and a DLP projector with Wi-Fi and BLUETOOTH™ wireless networks to display and detect objects and movement. In this embodiment, as players move their hands or objects on the table top, the cameras translate the motions into commands. One such example of this type of table is the SURFACE™ table developed by Microsoft Corporation. SURFACE is a trademark of Microsoft Corporation and BLUETOOTH is a trademark of Bluetooth SIG, Inc.

In one embodiment, one or more gaming tables each include at least one processor, such as a microprocessor, a microcontroller-based platform, a suitable integrated circuit or one or more application-specific integrated circuits (ASIC's). In one embodiment, the processor is in communication with or operable to access or to exchange signals with at least one local data storage or local memory device. In one embodiment, the local memory device stores information about the player's gaming activity and/or one or more awards. The local memory may also store, at least in part, other data such as image data, event data, player input data, or information and applicable game rules that relate to the play of the gaming table. In one embodiment, the local memory device includes random access memory (RAM). In one embodiment, the local memory device includes read only memory (ROM). In one embodiment, the local memory device includes flash memory and/or EEPROM (electrically erasable programmable read only memory).

In one embodiment, the processor of the gaming table is in communication with the central server. In one such embodiment, a message controller or message module associated with the central server sends one or more messages to be displayed on one or more display devices at the player's gaming table to inform the player and/or the dealer any suitable information.

In one embodiment, the processor of the gaming table disclosed herein is integrated or in communication with one or more player tracking systems. In one embodiment, the gaming table includes any suitable number of player tracking input devices, such as card readers or key pads to enter identification numbers. In another embodiment, each player station or seat includes an individual player tracking input device. In another embodiment, a gaming table includes a single player tracking input device. In another embodiment, only a dealer has access to the player tracking input device and inputs all of each player's information. In one embodiment, the gaming table, central server and/or player tracking system is operable to track any participating player's gaming activity as described above.

Team Progressive Awards

Figure 3:
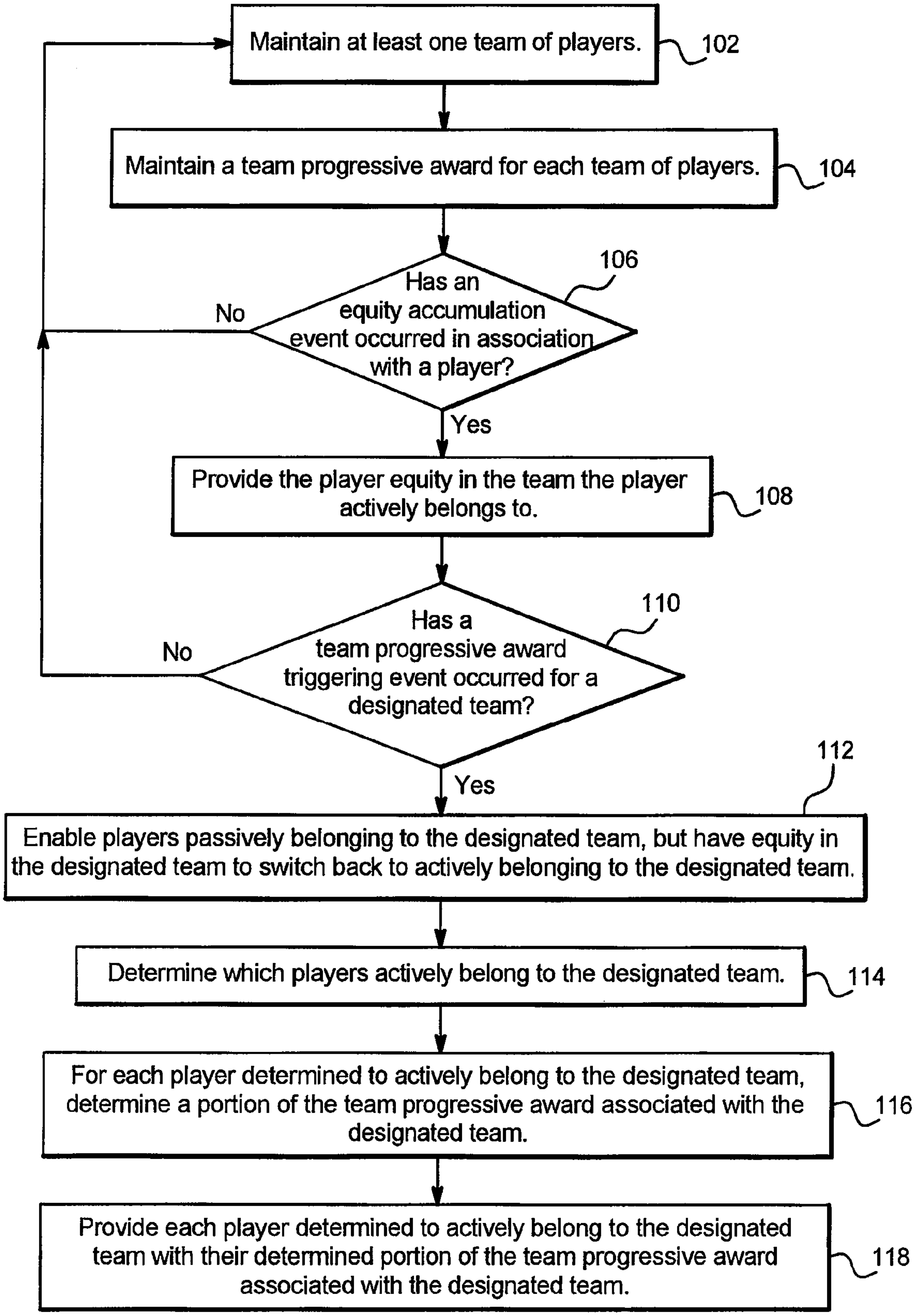
FIG. 3 is a flow-chart of one embodiment of the gaming system disclosed herein illustrating an accumulation of equity in one or more teams and providing one or more players a portion of a team progressive award based on this accumulated equity.

Turning now to FIG. 3, in operation of one embodiment of the gaming system disclosed herein, the central controller and/or gaming device processor maintains one or more teams or groups of players as indicated in block 102 of FIG. 3.

In one embodiment, each gaming device communicates data to the central controller regarding one or more gaming events occurring at that gaming device and/or the identification of the player at that gaming device. In this embodiment, the central controller analyzes such data and determines if the player at the gaming device is eligible to join one or more of the maintained teams or groups of players. In another embodiment, the central controller communicates to each participating gaming device data regarding which gaming events to track and/or which players to identify. In this embodiment, each gaming device communicates data to the central controller regarding such tracked players and/or tracked gaming events and the central controller analyzes such data to determine if the player at the gaming device is eligible to join one or more of the maintained teams or groups of players. Accordingly, in these embodiments, the central controller, central server or remote host tracks and maintains the teams, which players currently belong to which teams (i.e., which players are currently actively associated with which teams) and each player's amount of accumulated equity in each team on a real-time or near real-time basis.

Figure 4:
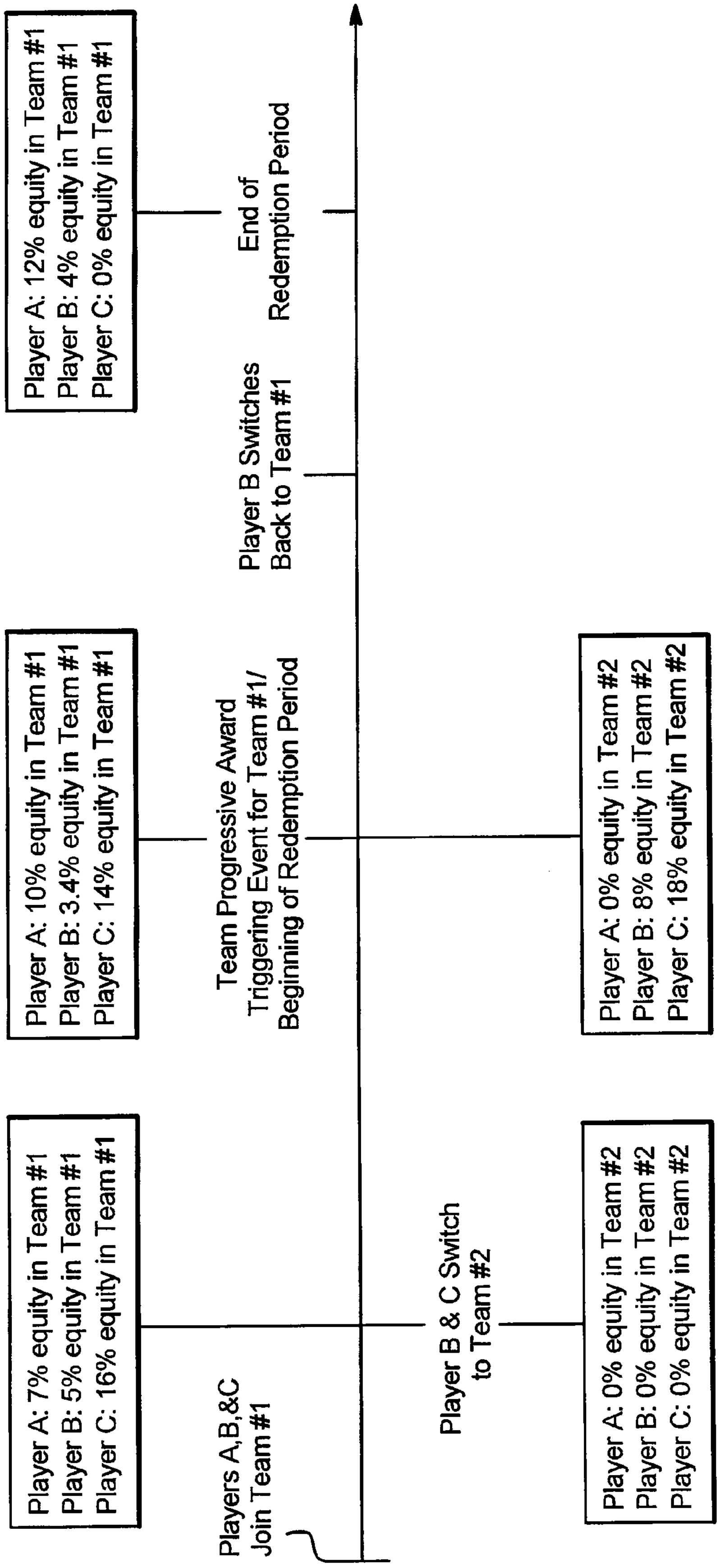
FIG. 4 is a timeline illustrating a plurality of players switching teams before and after a team progressive award triggering event.

In one embodiment, the gaming system forms, tracks and maintains at least one default group or team and enables one or more of the players at the gaming devices to register for or join the default group or team. In another embodiment, the gaming system forms, tracks and maintains a plurality of groups or teams and enables each player the opportunity to select which of the groups or teams to register for or join. For example, as seen in FIG. 4, Player A, Player B and Player C all initially register or join Team #1 at a first point in time.

In another embodiment, the gaming system enables one or more players to create their own private group or team which is tracked and maintained by the central server. In this embodiment, the gaming system enables one or more players to selectively invite other players to join this created private group or team. In one such embodiment, the gaming system enables one or more players to input or otherwise communicate to the gaming system a list of other players to form a group or team. In another such embodiment, the gaming system enables players to require a password for other players to join a created private group or team. For example, a player may create a private team and invite a group of friends who only want to play together to join. In different embodiments, a player is enabled to set up a team or group and/or join a team or group via the gaming device, a device connected to a data network, such as the internet, a player tracking device, a service window, a kiosk or any other suitable manner. It should be appreciated that enabling player's to input a list of other players to create a team and sharing at least part of any team progressive award with such other players provides a dynamic that the more players on a designated player's list (and the more players on a team), the more frequently that the designated player is provided a portion of a team progressive award, but it is more likely to be a lower portion of a team progressive award since it has to be shared with more players. Alternatively, the less players on a designated player's list (and the less players on a team), the less frequently the designated player is provided a portion of a team progressive award, but the more likely that when the designated player is provided a portion of a team progressive award, it will have a higher value.

In one example, a gaming establishment may form, track and maintain one or more private teams for a convention and invite people attending the convention to join these private teams or groups. In another embodiment, the gaming system enables players at different locations or gaming establishments to form a team. In different embodiments, the creation of one or more teams is predetermined, randomly determined, determined based on a generated symbol or symbol combination, determined based on a random determination by the central controller, determined based on a random determination by one or more gaming machines, determined based on one or more side wagers placed, determined based on the player's primary game wager, determined based on time (such as the time of day), determined based on an amount of coin-in accumulated in one or more pools or determined based on any other suitable method or criteria.

In one embodiment, a plurality of players are initially assigned to a team by the central server or the gaming establishment operator. In one such embodiment, different players are initially assigned to different groups based on their respective status or player tracking levels (such as determined through a player tracking system). For example, gold level players are assigned to one team and platinum level players are assigned to another team. In another example, each team may include a designated number of gold level players, a designated number of silver level players and a designated number of platinum level players. In another such embodiment, players are initially assigned to different teams or groups based on any suitable player characteristic which is categorized in one or more databases.

In another embodiment, players are initially assigned to different teams or groups based on the type of game they are playing. For example, players currently playing poker games are assigned to one team and players currently playing keno games are associated to another team. In another embodiment, players are initially assigned to different teams or groups based on the type of gaming apparatus they are playing. For example, players currently playing games at gaming devices are assigned to one team and players currently playing games at gaming tables are associated to another team. In a multi-property embodiment, players are initially assigned to a team based on their respective locations.

It should be appreciated that any suitable method of assigning one or more players to one or more teams may be implemented in accordance with the gaming system disclosed herein. In different embodiments, the determination of which players to assign to which teams is predetermined, randomly determined, determined based on a generated symbol or symbol combination, determined based on a random determination by the central controller, determined based on a random determination by one or more gaming machines, determined based on one or more side wagers placed, determined based on the player's primary game wager, determined based on time (such as the time of day), determined based on an amount of coin-in accumulated in one or more pools or determined based on any other suitable method or criteria.

In one embodiment, at a designated point in time, each group or team includes zero, one or more eligible players and zero, one or more ineligible players. In one embodiment, an eligible player or team member is a player that is actively associated with or actively belongs to a team. In one embodiment, a player is actively associated with or actively belongs to a team if that player is currently or substantially currently accumulating equity in that team as described below. In another embodiment, a player is actively associated with or actively belongs to a team based on any suitable number of criteria defined in any suitable manner by the implementer of the gaming system. For instance, a player is actively associated with a designated team if that made one or more inputs to belong to the designated team and the player placed a wager on a primary game of a gaming machine within a predetermined period of time. Other factors in determining whether a player is actively associated with a designated team include, but are not limited to, (a) the amount of time between each play of or wager on a primary game of a gaming machine; (b) the amount being wagered on one or more primary games; (c) the number of plays within a period of time; (d) the player not being actively associated with another team; (e) the player being logged into the gaming system (such as via a player tracking system); (f) the playing winning a designed award within a designated time period; and (g) the player not leaving the gaming device, such as to take a break or to leave the gaming establishment.

In one embodiment, an ineligible player or team member is a player that previously accumulated equity in a team but currently passively belongs to that team. It should be appreciated that any suitable manner of determining whether a player actively or inactively belong to a team may be implemented in accordance with the gaming system disclosed herein.

In one embodiment, as described in more detail below, the gaming system enables a player to concurrently belong to or be associated with a plurality of teams or groups at the same time. In this embodiment, the gaming system enables a player, at any given time, to be actively associated with or actively belong to one team or group (i.e., the player is eligible to win a team progressive award with the other members of the team) and also inactively associated with or passively belong to zero, one or more additional teams or groups (i.e., the player is ineligible to win a team progressive award with the other members of the team). For example, at a designated point in time, a first player may be actively associated with a first team or group (and thus eligible to win a team progressive award provided to the eligible members of the first team), inactively associated with a second team or group (and thus ineligible to win a team progressive award provided to the eligible members of the second team) and inactively associated with a third team or group (and thus ineligible to win a team progressive award provided to the eligible members of the third team).

Figure 5:
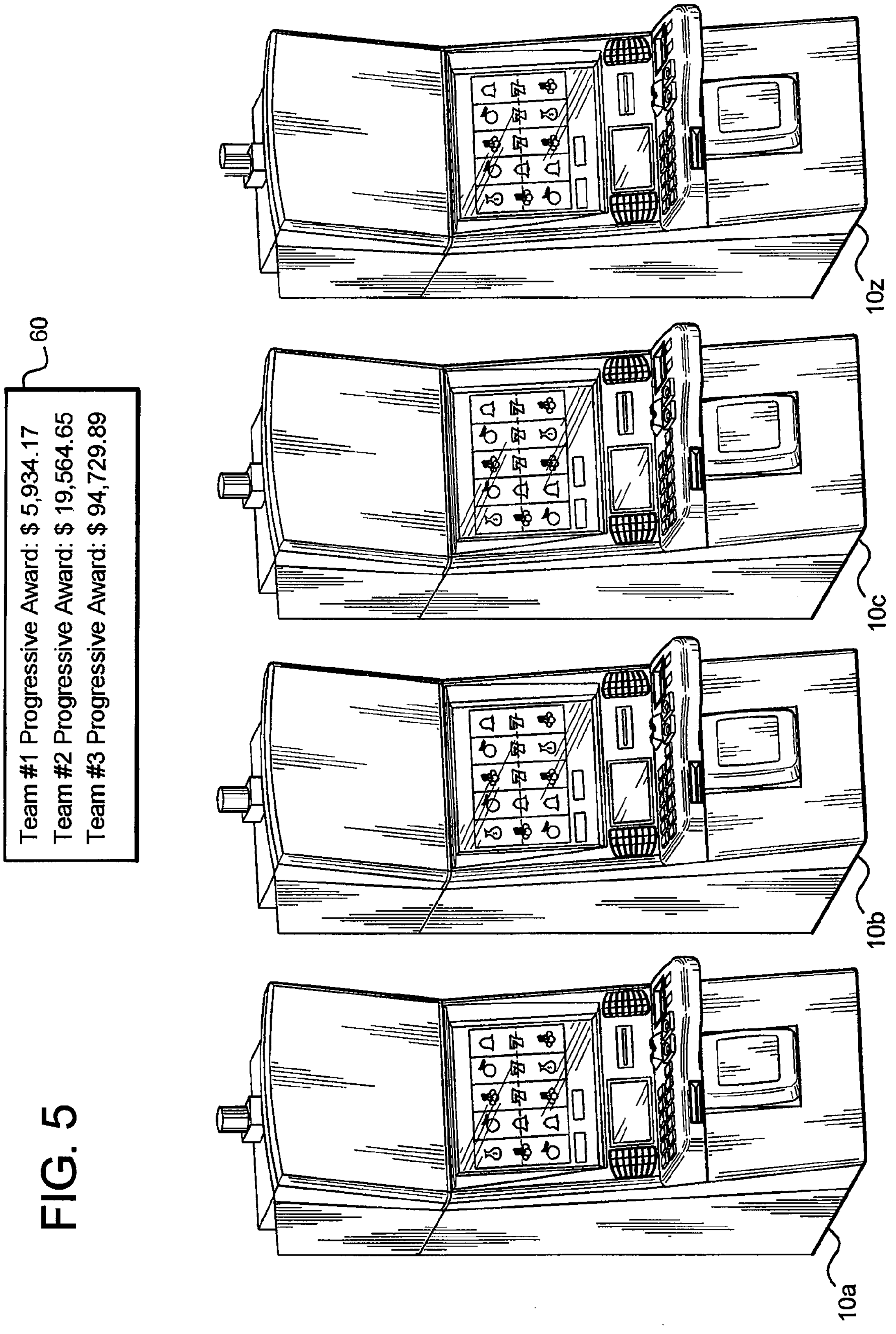
FIG. 5 is a schematic diagram of one embodiment of the gaming system disclosed herein illustrating a plurality of gaming machines and a display device displaying the different team progressive awards associated with the different available teams.

In one embodiment, in addition to maintaining one or more teams or groups of players, the central controller and/or gaming device processor maintains one or more team progressive awards. In one embodiment, as indicated in block 104 of FIG. 3, the gaming system maintains a separate team progressive award for each team of players. For example, as seen in FIG. 5, the gaming system maintains and displays to the players at the gaming devices in the gaming system (via one or more overhead display devices 60) a first team progressive award currently valued at $5,934.17 associated with a first team (i.e., Team #1 Progressive Award), a second team progressive award currently valued at $19,564.65 associated with a second team (i.e., Team #2 Progressive Award), and a third team progressive award currently valued at $94,729.89 associated with a third team (i.e., Team #3 Progressive Award).

In another embodiment, the gaming system maintains a team progressive award which is associated with a plurality of teams or groups of players. In this embodiment, a plurality of teams compete for this team progressive award. In this embodiment, if a plurality of teams are associated with a team progressive award and a specific player actively belonging to one specific team causes a trigger of that team progressive award, then the eligible players of that specific team are provided their relative portion of the team progressive award.

In different embodiments, the number of teams associated with a team progressive award is predetermined, randomly determined, determined based on a generated symbol or symbol combination, determined based on one or more player's statuses, determined based on a random determination by the central controller, determined based on a random determination by one or more gaming machines, determined based on one or more side wagers placed, determined based on the player's primary game wager, determined based on time (such as the time of day), determined based on an amount of coin-in accumulated in one or more pools or determined based on any other suitable method or criteria. In different embodiments, which teams are associated with which team progressive awards is predetermined, randomly determined, determined based on a generated symbol or symbol combination, determined based on one or more player's statuses, determined based on a random determination by the central controller, determined based on a random determination by one or more gaming machines, determined based on one or more side wagers placed, determined based on the player's primary game wager, determined based on time (such as the time of day), determined based on an amount of coin-in accumulated in one or more pools or determined based on any other suitable method or criteria.

In one embodiment, when forming teams as described above, the gaming system associates one or more of such teams with a start-up amount for the team progressive award associated with that team. In one embodiment, this start-up amount is funded, at least partially, via an amount provided by one or more marketing and/or advertising departments, such as a casino's marketing department. In another embodiment, this start-up amount is funded, at least partially, by a gaming system or gaming establishment loan which is recouped as players associated with the team place wagers at the gaming devices in the gaming system. In one embodiment, player created private teams are associated with such start-up amounts. In another embodiment, player created private teams are not associated with such start-up amounts. It should be appreciated that any suitable manner of funding such start-up amounts may be implemented in accordance with the gaming system disclosed herein.

In this embodiment, upon a player joining a team (i.e., if a player is actively associated with a team), a percentage of that player's wagers placed or coin-in increment or fund the team progressive award associated with that team. For example, if a Player A is currently actively associated with Team #1 and 1.0% of coin-in placed by each player actively associated with Team #1 will fund the Team #1 Progressive Award, then for every $10.00 wagered by Player A (while actively associated with Team #1), the Team #1 Progressive Award will increment by $0.10. In different embodiments, the percentage of a player's wagers placed which funds the team progressive award associated with the player's current team is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In one embodiment, a specific percentage of a player's coin-in or wagers placed is allocated to increment the associated team progressive award with another specific percentage allotted to offset the cost of the initial start-up amount of the team progressive award. For example, if it is determined that 0.25% of a player's coin-in will be returned to one or more players of a team as an additional payback, then 0.23% of the player's coin-in increments the team progressive award associated with the team and 0.02% of the player's coin-in is allotted to offset or repay the cost of the initial start-up amount of the team progressive award. In another embodiment, a specific percentage of a player's coin-in or wagers placed is allocated to increment the associated team progressive award with another specific percentage allotted to a separate meter to fund the next start-up amount of the team progressive award. In another embodiment, the gaming system includes a cap to the amount of the start-up value, wherein any extra amount over the cap is not used or is added to the team progressive award. It should be appreciated that utilizing a start-up amount or value provides for larger reset amounts and thus larger team progressive awards, which reduces possible jackpot fatigue.

In one embodiment of the gaming system and method disclosed herein, as indicated in diamond 106 of FIG. 3, the central server determines if an equity accumulation event occurred in association with a player. In another embodiment, the central server determines if an equity accumulation event occurred in association with a gaming device which a player is currently playing.

In one embodiment, the gaming system tracks the occurrences of one or more suitable events occurring at or in association with the player and/or the player's currently played gaming device and determines, based on these tracked events, whether an equity accumulation event has occurred. In one such embodiment, the gaming system defines one or more game play parameters, wherein each time a player's tracked game play activity satisfies the defined parameter, an equity accumulation event occurs.

In one embodiment, an equity accumulation event occurs based on a player's wagering activity. In one embodiment, upon the specific player wagering a designated amount of coin-in at one or more of the gaming devices in the gaming system, the central sever causes an equity accumulation event to occur. For example, for every $10 wagered at a gaming device in the gaming system, the central server causes an equity accumulation event to occur. In different embodiments, the amount of coin-in which must be wagered by a player for each occurrence of an equity accumulation event is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In one embodiment, an equity accumulation event occurs based on a specific player's current gaming device providing a designated amount of coin-out to the player. For example, for every $9 provided to a player by a gaming device in the gaming system, the central server causes an equity accumulation event to occur. In different embodiments, the amount of coin-out which must be provided to a player for each occurrence of an equity accumulation event is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In another embodiment, an equity accumulation event occurs based, at least in part, on time. In one such embodiment, for playing the games of one or more gaming devices in the gaming system for a designated period of time, the gaming system causes an equity accumulation event to occur. For example, for every thirty minutes spent playing the games of one or more gaming devices in the gaming system, the central server causes an equity accumulation event to occur.

In another embodiment, an equity accumulation event occurs based, at least in part, on a player's status (as determined through a player tracking system). For example, for every thirty minutes spent playing the games of one or more gaming devices in the gaming system, the central server causes an equity accumulation event to occur for a gold level player. In this example, for every ten minutes spent playing the games of one or more gaming devices in the gaming system, the central server causes an equity accumulation event to occur for a platinum level player. In another embodiment, an equity accumulation event occurs based, at least in part, on placing one or more side bets or side wagers.

In one embodiment, an equity accumulation event occurs based on a displayed event in a play of one or more games of one or more of the gaming devices in the gaming system. In another embodiment, an equity accumulation event occurs independent of any displayed event in any play of any game of any of the gaming devices in the gaming system. In different embodiment, an equity accumulation event occurs based on a total amount waged during one or more designated time periods, one or more primary or base game events or outcomes generated, one or more secondary or bonus game events or outcomes generated, one or more random determinations, and a player's non-game play history. It should be appreciated that any suitable manner or method of determining if an equity accumulation event occurs may be implemented in accordance with the gaming system disclosed herein.

In one embodiment, if the determination is that an equity accumulation event has not occurred in association with a player and/or a gaming device in the gaming system, the gaming system continues maintaining at least one team of players and at least one team progressive award as described above. In this embodiment, if the determination is that an equity accumulation event occurred in associated with a player and/or a gaming device in the gaming system, the central server provides the player equity in the team the player actively belongs to as indicated in block 108 of FIG. 3. That is, if a player actively belongs to a team or group and an equity accumulation event occurs in association with that player (or a gaming device that player is currently playing at), the player accumulates or otherwise builds equity in that team or group. In one such embodiment, for each occurrence of an equity accumulation event, a player is provided one or more equity accumulation units. In this embodiment, each equity accumulation unit represents an equity portion or stake of the player's current team. It should be appreciated that in this embodiment, the equity portion of the player's current team which an equity accumulation unit represents is dynamic and based on the total number of equity accumulation units outstanding.

In one embodiment, upon an occurrence of an equity accumulation event, the gaming system determines an amount of equity in the player's current team to provide to the player. In one embodiment, the amount of equity to provide to the player is based on one or more factors, such as the number of other player's accumulating equity in the team, the amount of equity previously provided in the team, the player's status (such as determined through a player tracking system), the player's primary game wager, time (such as the time of day), an amount of coin-in accumulated in one or more pools, and/or one or more side wagers placed. In different embodiments, the amount of equity in the player's current team to provide to the player is predetermined, randomly determined, determined based on a generated symbol or symbol combination, determined based on a random determination by the central controller, determined based on a random determination at the gaming machine, or determined based on any other suitable method or criteria.

Figure 6A:
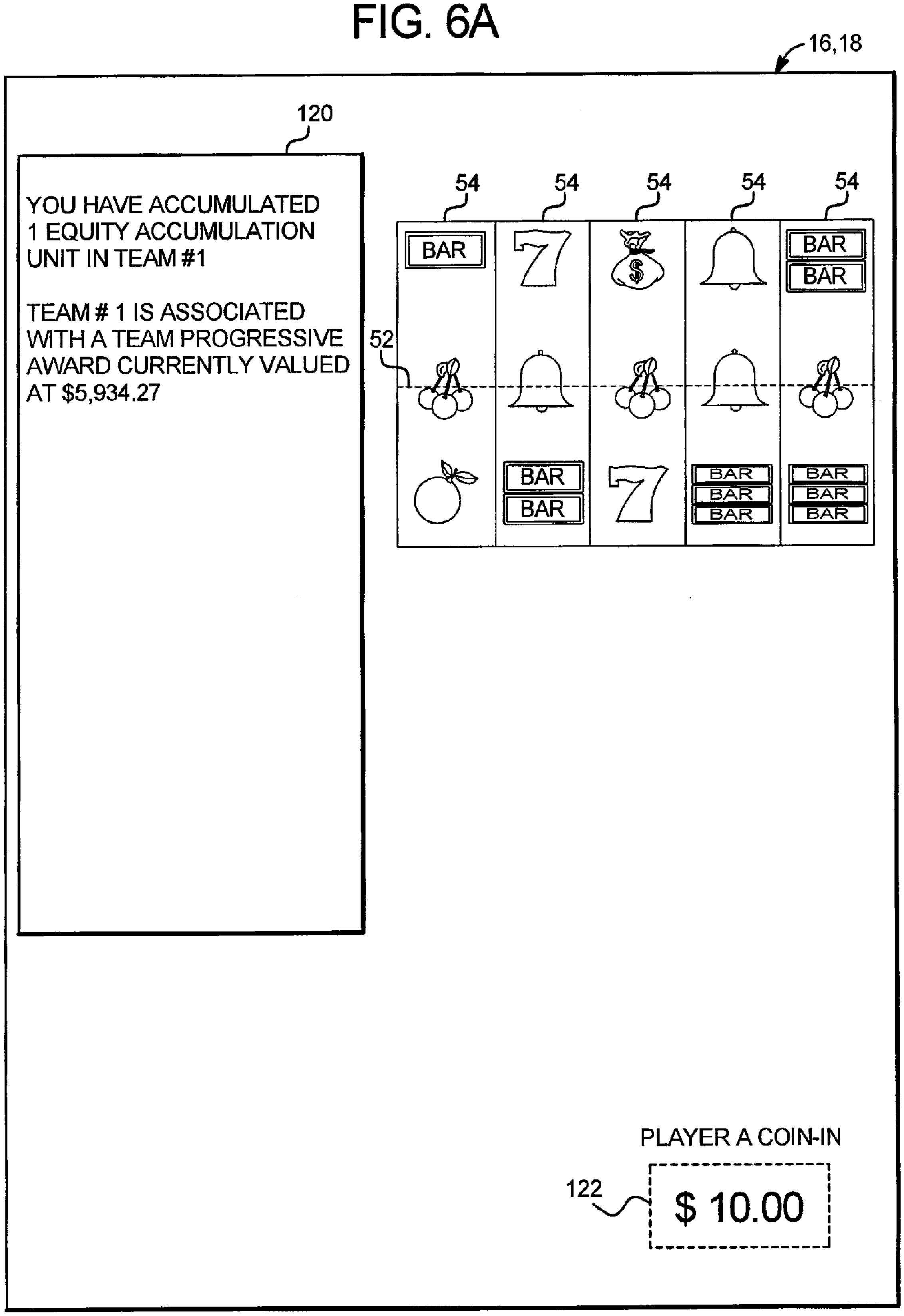
FIGS. 6A, and 6B are front-side perspective views of one embodiment of a gaming system disclosed herein illustrating a player accumulating equity in a team and the gaming system providing the player the opportunity to switch teams.

For example, as seen in FIG. 6A, if an equity accumulation event occurs for every $10 of coin-in wagered by a player, Player A is actively associated with Team #1 and the central server determines that Player A has $10 of tracked wagers placed, (as indicated in the Player A Coin-In Meter 122), in addition to incrementing the team progressive award associated with the player's current team, the central server causes an equity accumulation event to occur for Player A. In this example, the gaming device forms or opens a window on the main game display, such as service window 120, to display to Player A that they have accumulated 1 equity accumulation unit in Team 1. It should be appreciated that any suitable manner of displaying and providing the accumulation of equity in one or more teams may be implemented in accordance with the gaming system disclosed herein. It should be further appreciated the amount of tracked coin-in associated with each player is displayed for illustration purposes only and otherwise would not likely be displayed to the player. In one example embodiment, the gaming device displays appropriate messages such as "YOU HAVE ACCUMULATED 1 EQUITY ACCUMULATION UNIT IN TEAM #1" and "TEAM #1 IS ASSOCIATED WITH A TEAM PROGRESSIVE AWARD CURRENTLY VALUED AT $5,934.27" to the player visually, or through suitable audio or audiovisual displays.

In one embodiment, the gaming system enables a player to switch teams to accumulate or build up equity in another team maintained by the gaming system. In this embodiment, the gaming system enables a player to hold equity in a plurality of teams or groups at any given time. That is, if a player switches from actively belonging to a first team to actively belonging to a second team, the player retains any built up equity in the first team, while they accumulate or build up equity in the second team. In these embodiments, a player actively belongs to or is actively associated with a team by joining or switching to that team (without switching to another team) and a player passively belongs to or is passively associated with a team by previously accumulating equity in that team, even though the player is not currently building equity in that team.

In the example illustrated in FIG. 4, at a second point in time, Player A elected to remain with Team #1 but Player B and Player C each elected to switch from Team #1 to Team #2. In this example, by switching from Team #1 to Team #2, Player B and Player C are each classified as actively associated with Team #2 and passively associated with Team #1. In this example, at the second point in time, based on the occurrences of one or more equity accumulation events as described above, Player A has accumulated a 7% equity stake in Team #1, Player B has accumulated a 5% equity stake in Team #1, and Player C has accumulated a 16% equity stake in Team #1. This example further illustrates that since Player B and Player C are switching from Team #1 to Team #2 for a first time, neither Player A, Player B or Player C has any accumulated equity in Team #2.

It should be appreciated that this configuration of enabling players to switch amongst multiple teams invokes an element of player strategy as a player must choose between building equity in one team (and thus having a larger share of a team progressive award if the player is actively associated with that team when the eligible members of this one team are provided a team progressive award) or spreading their equity around amongst a plurality of teams (and thus having a smaller stake of a number of team progressive awards if the player is actively associated with such teams when the eligible members of these teams are provided team progressive awards). This configuration further invokes an element of player strategy as a player must choose between building equity in a team with a large number of members (and thus having a smaller relative amount of equity in the team and the associated team progressive award which may potentially grow to a large value based on the large number of members) or building equity in a team with a small number of members (and thus having a larger relative amount of equity in the team and a potentially smaller team progressive award). Such a configuration further provides that new players may join a team or group at any time (as long as the team is not in a redemption period as described below) and accumulate equity in the team (and equity in the team progressive award associated with that team).

In one embodiment, the gaming system enables a player to switch from one team to another team at any given time. In another embodiment, the gaming system enables a player to switch from one team to another given team upon an occurrence of a designated event. In one such embodiment, the designated event which enables a player to switch teams occurs based on a displayed event in a play of one or more games of one or more of the gaming devices in the gaming system. In another embodiment, the designated event which enables a player to switch teams occurs independent of any displayed event in any play of any game of any of the gaming devices in the gaming system.

Figure 6B:
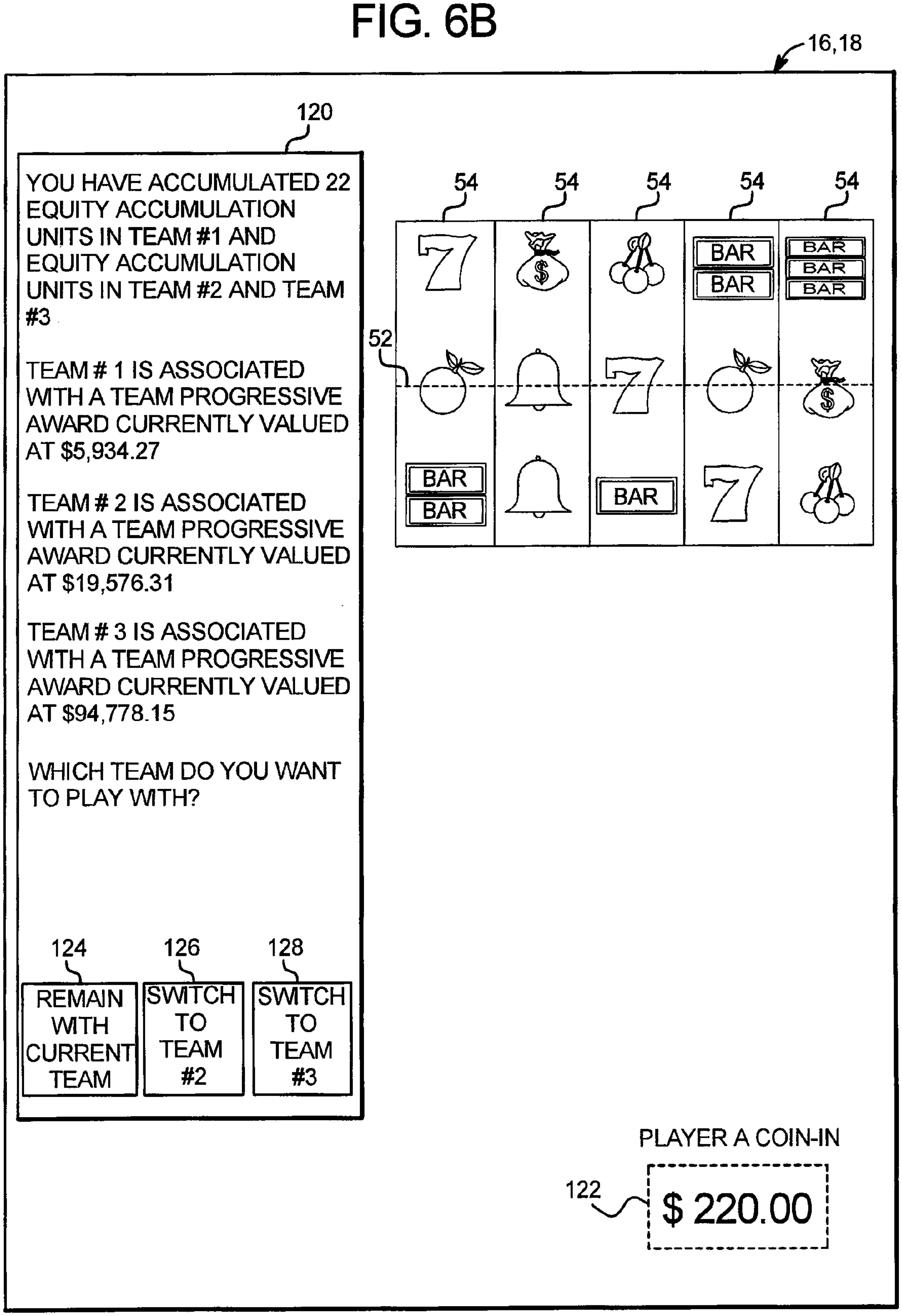

For example, as seen in FIG. 6B, the gaming system enables Player A to remain with Team #1, switch from Team #1 to Team #2 or to switch from Team #1 to Team #3. In one example embodiment, the gaming system displays to the player any suitable information regarding the available teams, any accumulated equity, and the team progressive awards associated with the available teams. For example, the gaming device displays appropriate messages such as "YOU HAVE ACCUMULATED 22 EQUITY ACCUMULATION UNITS IN TEAM #1 AND 0 EQUITY ACCUMULATION UNITS IN TEAM #2 AND TEAM #3" and "TEAM #1 IS ASSOCIATED WITH A TEAM PROGRESSIVE AWARD CURRENTLY VALUED AT $5,934.27" "TEAM #2 IS ASSOCIATED WITH A TEAM PROGRESSIVE AWARD CURRENTLY VALUED AT $19,576.31" and "TEAM #3 IS ASSOCIATED WITH A TEAM PROGRESSIVE AWARD CURRENTLY VALUED AT $94,778.15" to the player visually, or through suitable audio or audiovisual displays.

In one example, if Player A stays with Team #1 (by utilizing the Remain with Current Team indicator 124 of FIG. 6B), the player continues accumulating equity in Team #1 as described above. In another example, if Player A decides to switch to Team #2 (by utilizing the Switch to Team #2 indicator 126 of FIG. 6B), Player A is reclassified as actively associated with Team #2 and passively associated with Team #1. In this example, Player A retains any built up equity in Team #1 (in this case the twenty-two equity accumulation units) as they accumulate equity in Team #2. In another example, if Player A decides to switch to Team #3 (by utilizing the Switch to Team #3 indicator 128 of FIG. 6B), Player A is reclassified as actively associated with Team #3 and passively associated with Team #1. In this example, Player A retains any built up equity in Team #1 (in this case the twenty-two equity accumulation units) as they accumulate equity in Team #3. It should be appreciated that if Player A switches to Team #2 or Team #3, Player A may accumulate equity in such teams in the same manner as accumulating equity in Team #1 or in any suitable manner of accumulating equity as described above.

In one embodiment of the gaming system and method disclosed herein, in addition to enabling players to accumulate equity in one or more teams, the central server determines if a team progressive award triggering event occurs for a designated team as indicated in diamond 110 of FIG. 3. In one embodiment, the team progressive award triggering event occurs based on a displayed event in a play of one or more games of one or more of the gaming devices in the gaming system. In another embodiment, the team progressive award triggering event occurs independent of any displayed event in any play of any game of any of the gaming devices in the gaming system. It should be appreciated that a team progressive award triggering event occurs for a designated team if the team progressive award triggering event occurs for at least one actively associated member of that team (or for at least one gaming device currently played by at least one actively associated member of that team).

In one embodiment, the gaming system tracks the occurrences of one or more suitable events occurring at or in association with one or more players and/or one or more gaming devices in the gaming system and determines, based on these tracked events, whether a team progressive award triggering event has occurred. In one such embodiment, the gaming system defines one or more game play parameters, wherein each time a player's tracked game play activity satisfies the defined parameter, the triggering event occurs.

In another embodiment, the team progressive award triggering event occurs based on an amount of coin-in or wagered activity. In this embodiment, the gaming system determines if an amount of coin-in wagered at one or more gaming devices in the gaming system reaches or exceeds a designated amount of coin-in (i.e., a team progressive award triggering event threshold coin-in amount). Upon the amount of coin-in wagered at one or more gaming devices in the gaming system reaching or exceeding the team progressive award triggering event threshold coin-in amount, the gaming system causes the team progressive award triggering event to occur. In different embodiments, the team progressive award triggering event threshold coin-in amount is predetermined, randomly determined, determined based on a player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In one embodiment, the gaming system includes a plurality of team progressive award triggering event threshold coin-in amount tables, wherein a specific coin-in value is selected from the table. One example shown in the table of FIG. 7 includes a variety of team progressive award triggering event threshold coin-in amount tables that have different hit properties. In this example, the gaming system selects one of these tables as the active table based on the probability defined of being selected. Once the table is chosen as the active table, the gaming system randomly selects a hit value associated with the ranges defined. For example, based on the probabilities associated with each table, the gaming system selects the medium table and selects a team progressive award triggering event threshold coin-in amount of $2,550,190 (which is in the range of $100,000 to $3,000,000 associated with the selected medium table). In this embodiment, each of the team progressive awards must increment to a certain value before they are provided to the members of a team, wherein incrementing to such threshold coin-in amounts is associated with an average expected time per team progressive award hit. It should be appreciated that using a weighted table enables the gaming system designer to control the ranges in which the team progressive awards will hit (i.e., using the table of FIG. 7, the average reset per round could be calculated at $455.10 ($0.0002\times\$2,275,500$)).

In another embodiment, as seen in FIG. 8, the gaming system is configured such that how frequently the different sized team progressive awards hit is based on the different amount of team members playing and the wager limit in effect. In this example, (which assumes a wager rate of $7.50 per minute or $0.75 per game at 10 games per minute and that 0.23% of the coin-in increments the team progressive award and 0.02% of the coin-in is allotted to a reserve pool), if the wager limit is set to hit at $20,000 and there are 50 players playing, it would take 0.89 hours for the team progressive award to hit and the players or members of the team would split an increment award of $46. In another example, if the wager limit is set to hit at $10,000,000 and there are 200 players playing, it would take 111.11 hours (or 4.63 days) for the team progressive award to hit and the players or members of the team would split an increment award of $23,000. In such an embodiment, larger increment rates enable for more attractive and more rapid hitting jackpots. It should be appreciated that these figures are for illustration purposes only and if more players play for the team progressive award, then each player would need to wager less per player for the team progressive award to hit in the same amount of time. It should be further appreciated that the characteristics of a team progressive award triggering event are at the discretion of the gaming system designer and operator and can be customized based on a number of suitable parameters.

In another embodiment, the team progressive award triggering event occurs based on an amount of coin-out. In this embodiment, the gaming system determines if an amount of coin-out provided by one or more gaming devices in the gaming system reaches or exceeds a designated amount of coin-out (i.e., a team progressive award triggering event threshold coin-out amount). Upon the amount of coin-out provided at one or more gaming devices in the gaming system reaching or exceeding the team progressive award triggering event threshold coin-out amount, the gaming system causes the team progressive award triggering event to occur. In different embodiments, the team progressive award triggering event threshold coin-out amount is predetermined, randomly determined, determined based on a player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In one alternative embodiment, the team progressive award triggering event occurs based on a predefined variable reaching a defined parameter threshold. For example, when the $500,000^{th}$ player has played a gaming machine of the gaming system (ascertained from a player tracking system), such a triggering event occurs. In different embodiments, the predefined parameter thresholds include a length of time, a length of time after a certain dollar amount is hit, a wager level threshold for a specific machine (which gaming device is the first to contribute $250,000), a number of gaming machines active, or any other parameter that defines a suitable threshold.

In another embodiment, the team progressive award triggering event occurs based on time. In this embodiment, a time is set for when such a team progressive award triggering event will occur. In one embodiment, such a set time is based on historic data.

In another embodiment, the team progressive award triggering event occurs based upon gaming system operator defined player eligibility parameters stored on a player tracking system (such as via a player tracking card or other suitable manner). In this embodiment, the parameters for eligibility are defined by the gaming system operator based on any suitable criterion. In one embodiment, the central controller/gaming device processor recognizes the player's identification (via the player tracking system) when the player inserts or otherwise associates their player tracking card in the gaming machine. The central server/gaming device processor determines the player tracking level of the player and if the current player tracking level defined by the gaming system operator is eligible for a team progressive award. In one embodiment, the gaming system operator defines minimum bet levels required for the team progressive award triggering event to occur based on the player's card level.

In another embodiment, the team progressive award triggering event occurs based on a system determination, wherein the team progressive award triggering event occurs due to a random selection by the central controller. In one embodiment, the central controller tracks all active gaming machines and the wagers they placed. Each gaming machine has its own entry defining its state as either active or inactive and also defining the values of the wagers from that gaming machine. In one embodiment, active status means that the gaming machine is being actively played by a player and enrolled/inactive status means that the gaming machine is not being actively played by a player. The active status requirements can be based on any suitable number of satisfied criteria or defined in any suitable manner by the implementer of the gaming system. For instance, a play of or wager on the primary game of the gaming machine within a predetermined period of time may be part of the determination of whether that gaming machine is in the active status. Other factors such as: (a) the amount of time between each play of or wager on the primary game of the gaming machine; (b) the amount being wagered on the primary game(s); and (c) the number of plays within a period of time, may also or alternatively be part of the determination of whether a gaming machine is in the active status. On the other hand, inactive status means that the gaming machine is one of the gaming machines in the gaming system, but is not in the active status (i.e., not being actively played by a player according to one or more of the predetermined criteria). In one such embodiment, based on the gaming machine's state as well as one or more wager pools associated with the gaming machine, the central controller determines whether the team progressive award triggering event occurs in association with that player. In one such embodiment, the player who consistently places a higher wager is more likely to cause a team progressive award triggering event to occur than a player who consistently places a minimum wager. It should be appreciated that the criteria for determining whether a player is in active status or inactive status may the same as, substantially the same as, or different than the criteria for determining whether a player actively belongs to or passively belongs to a team or group.

In another embodiment, the team progressive award triggering event occurs by determining if any numbers allotted to a gaming device match a randomly selected number. In this embodiment, upon or prior to each play of each gaming machine played by a player actively belonging to a team, a gaming device selects a random number from a range of numbers and during each primary game, the gaming machine allocates the first N numbers in the range, where N is the number of credits bet by the player in that primary game. At the end of the primary game, the randomly selected number is compared with the numbers allocated to the player and if a match occurs, such a triggering event occurs for the player at that particular gaming machine. It should be appreciated that any suitable manner of causing a team progressive award triggering event to occur may be implemented in accordance with the gaming system and method disclosed herein.

In one embodiment, if the determination is that a team progressive award triggering event has not occurred for a designated team, the gaming system continues maintaining at least one team of players, maintaining at least one team progressive award and providing equity in the teams as described above. In this embodiment, if the determination is that a team progressive award triggering event occurred, the central server enables players passively belonging to the designated team, but having equity in the designated team, to switch back to actively belonging to the designated team as indicated in block 112 of FIG. 3. That is, in one such embodiment, the gaming system provides a designated redemption period for players who passively belong to the team (i.e., players who have accumulated equity in the team but do not currently actively belong to the team) to switch back to actively belong to the team or group.

In one such embodiment, the designated redemption period is a length of time which enables players to play one or more games and then return to actively belong to the team or group to claim their share of the provided team progressive award. It should be appreciated that the exact period of time of the redemption period will vary based on many factors, such as but not limited to, the number of outstanding passively associated players, the total number of players associated with a team, and the amount of the associated team progressive award. In different embodiments, the designated redemption period is any suitable period of time which may be predetermined, randomly determined, determined based on a player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In one embodiment, the gaming system utilizes one or more display devices throughout the gaming establishment to inform players that a team progressive award triggering event has occurred for a designated team. For example, appropriate messages such as "TEAM #1 PROGRESSIVE AWARD WILL BE AWARDED IN 5 MINUTES" and "ALL TEAM #1 MEMBERS NEED TO HAVE THEIR CARD IN A GAMING MACHINE AT THIS TIME TO RECEIVE THEIR PORTION OF THE TEAM #1 PROGRESSIVE AWARD" are provided to the player visually, or through suitable audio or audiovisual displays. In one embodiment, the gaming system provides the players that are passively associated with the designated team one or more methods of electing to be actively associated with the designated team again. Such methods, include but are not limited to making one or more suitable inputs at a gaming device, a player tracking device, a service window, or a kiosk. In another embodiment, the gaming system provides the players that are passively associated with the designated team and not currently located at the gaming establishment with one or more methods of electing to be actively associated with the designated team again. Such methods, include but are not limited to responding to an email, responding to a text message or logging into a website.

In another embodiment, the gaming system utilizes a lock-out period wherein new players are no longer enabled to join (i.e., become actively associated with) a team or group. In one such embodiment, the lock-out period begins prior to the redemption period and ends when the team progressive award is provided. In another such embodiment, the lock-out period beings simultaneous with or during the redemption period and ends when the team progressive award is provided. In another such embodiment, the lock-out period begins after the redemption period and ends when the team progressive award is provided. In one example embodiment, the gaming system informs the players that a team progressive award will hit in a designated amount of time, such as in fifteen minutes, and that no new players may join the designated team. In this example, the gaming system enables any players that are passively associated with the designated team to switch back to the designated team, wherein all active players of the designated team have the provided amount of time to build as much equity in the designated team as possible before the team progressive award is provided.

For example, as seen in FIG. 4, at a third point in time, a team progressive award triggering event occurs for Team #1 and a suitable redemption period begins for passively associated members of Team #1. In this example, at the third point in time, based on the occurrences of one or more equity accumulation events as described above, Player A is actively associated with Team #1 and has accumulated a 10% equity stake in Team #1. In this example, at the third point in time, Player B is passively associated with Team #1 and has accumulated a 3.4% equity stake in Team #1, and Player C is passively associated with Team #1 and has accumulated a 14% equity stake in Team #1 and other players (not shown) have accumulated the remaining 72.6% equity stake in Team #1. This example further illustrates that since switching over to Team #2, Player B has accumulated an 8% equity stake in Team #2, and Player C has accumulated a 18% equity stake in Team #2 and other players (not shown) have accumulated the remaining 74% equity stake in Team #2. As seen in this example, Player B and Player C retain their previously accumulated equity stake in Team #1, however as Player A has continued accumulating equity in Team #1 (while Player B and Player C were not), the relative percentage of Player B and Player C's equity in Team #1 declined. It should be appreciated that as described above, players accumulate equity in teams based on one or more aspects of their gaming experience, including but not limited to, their rate of play, the length of their player and their bet or wager size.

After the expiration of the designated redemption period, the gaming system determines which players actively belong to the designated team as indicated in block 114 of FIG. 3. In this embodiment, such eligible players include the players that were actively associated with the team when the team progressive award triggering event occurred (assuming such players did not switch to another team or otherwise become passively associated with the team) and any players that switched back to being actively associated with the designated team. For example, as seen in FIG. 4, at a fourth point in time (before the end of the redemption period) Player B switched back to Team #1.

As indicated in blocks 116 and 118 of FIG. 3, for each player determined to actively belong to the designated team, the gaming system determines and provides a portion of the team progressive award associated with the designated team. In one embodiment, each player's share or portion of the team progressive award is based on that player's relative amount of accumulated equity in the team or group compared to each other eligible player's amount of accumulated equity in the team or group.

In one such embodiment, if an amount of accumulated equity for a player is based on their amounts wagered or coin-in, then a player's portion of the team progressive award will be a percentage of the coin-in that player contributed compared to the total coin-in of all eligible team members (i.e., players that actively belong to the team). For example, Team #1 had 200 members registered with the team, but at the time of the team progressive award triggering event, only nine of the players (Players A, B and D to J as seen in FIG. 9) are actively associated with Team #1 and only these nine players will be provided their relative portions of the Team #1 Progressive Award. In this example, since these nine players are the only players actively associated with Team #1, the $125,000 of total wagers these nine players made for Team #1 is used to determine each player's equity in the Team #1 Progressive Award. For example, Player A contributed $15,000 of wagers for Team #1 and thus the gaming system determines to provide Player A 12% (or 15,000/125,000) of the Team #1 Progressive Award. In this example, the Team #1 Progressive Award has incremented to a current value of $6000 when the team progressive award triggering event occurs and thus Player A is provided $720 (or 6000×0.12).

It should be appreciated that as the quantity of players that actively belong to a team or group (after the team progressive award triggering event and any redemption period thereafter) is often less than the quantity of players that accumulated equity in the team or group, each player's relative proportion or share of a team progressive award will often be larger than the player's built up equity in the team provided the progressive award. That is, such players that do not actively belong to a team to claim their relative proportion or share of the team progressive award (even though such players previously accumulated equity in the team) will forfeit their share of the team progressive award and this forfeited share will be distributed amongst the remaining eligible members of the team. In other words, in one embodiment, the gaming system nullifies any equity accumulation units in a designated team provided to any players not actively associated with the designated team after the team progressive award triggering event and after any redemption period thereafter. It should thus be appreciated that although a player accumulates equity in a team or group over a period of time, the player's equity share or portion of the team progressive award is determined when the gaming system determines which players to provide a portion of the team progressive award (i.e., after the team progressive award triggering event and any redemption period thereafter).

For example, as seen in FIG. 4, Player C did not switch back to Team #1 before the end of the redemption period and thus Player C's accumulated equity in Team #1 was forfeited. In this example, since Player C's accumulated equity in Team #1 was forfeited, the accumulated equity in each of the remaining active players in Team #1 was increased as Player C's 14% equity stake in Team #1 was distributed amongst the remaining active players in Team #1. That is, as Player C's accumulated equity in Team #1 decreased from 14% to 0%, Player A's accumulated equity in Team #1 was increased from 10% to 12% and Player B's accumulated equity in Team #1 increased from 3.4% to 4%.

After providing the team progressive award to the eligible players of a designated team, the team progressive award resets and increments as described above. In one embodiment, each player's accumulated equity in the designated team resets. In another embodiment, one or more players retain part or all of their accumulated equity in the designated team. In different embodiments, the determination of whether a player retains any equity in a designated team and if so, the amount of retained equity is predetermined, randomly determined, determined based on a player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In one alternative embodiment, the gaming system enables a player to actively belong to or be associated with a plurality of teams or groups at the same time. That is, in this alternative embodiment, the gaming system enables a player, at any given time, to be concurrently actively associated with or actively belong to a plurality of teams or groups (i.e., the player is eligible to win a team progressive award with the other members of the team).

In one such embodiment, if a player is actively associated with a plurality of teams or groups at one point in time, the player accumulates equity in each team, wherein the equity accumulated in each team is a portion or fraction of the equity the player would have accumulated in the team if the player actively belonged to that team alone. For example, if a player actively belongs to one team and each $1 wagered by a player causes the player to accumulate two equity accumulation units in that one team, then if the player actively belongs to two teams, the same $1 wagered by the player causes the player to accumulate one equity accumulation unit in each of the two teams the player actively belongs to. Moreover, in this embodiment, if a player is concurrently actively associated with a plurality of teams or groups at one point in time, the player contributes to the team progressive award for each team, wherein the amount contributed to each team progressive award is a portion or fraction of the contribution which would had been made if the player actively belonged to the team alone.

In another such embodiment, the gaming system enables a player to utilize a plurality of player tracking cards to actively belong to or be associated with a plurality of teams or groups at the same time. In this embodiment, the gaming system enables one player tracking card associated with the player to be actively associated with a first team and another player tracking card also associated with the player to be actively associated with a second team. For example, if a player is currently playing two gaming devices and the player has inputted a separate player tracking card into each gaming device, the gaming system enables the player's wagers at a first of the gaming devices (tracked via the player's first player tracking card) to accumulate equity in a first team and concurrently enables the player's wagers at a second of the gaming devices (tracked via the player's second player tracking card) to accumulate equity in a second team.

In another embodiment, the central controller and/or gaming device processor maintains a plurality of team progressive awards for each of one or more of the teams of players. In this embodiment, if a progressive award triggering event occurs for a team of players that is associated with a plurality of team progressive awards, the gaming system provides one or more of such team progressive awards to the active members of that team. In different embodiments, which of the plurality of progressive awards maintained for that team of players which are provided to the active members of that team is predetermined, randomly determined, determined based on one or more player's statuses (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In another embodiment, the central controller and/or gaming device processor maintains one or more team predetermined awards for one or more of the teams of players. In this embodiment, if a triggering event occurs for a team of players that is associated with one or more team predetermined awards, the gaming system provides one or more of such team predetermined awards to the active members of that team.

In another embodiment, the gaming system maintains a separate team progressive award for each of a plurality of teams or groups, wherein the plurality of teams are associated with a common or shared team progressive award triggering event. In one embodiment, the gaming system utilizes a group display device (not shown) to display the current value of each team progressive award and the number of players currently actively associated with each team. In one such embodiment, the gaming system enables players to accumulate equity in one or more teams as described above until the central server determines that the common team progressive award triggering event occurs. In this embodiment, after the common triggering event occurs (and any suitable redemption period), one of the plurality of team progressive awards associated with the common triggering event is provided to the active members of that team. In this embodiment, the remaining team progressive awards associated with the common triggering event reset. In one embodiment, the determination of which of the team progressive awards associated with the common triggering event to provide to the active members of that team is based on the occurrence of the common triggering event. For example, if the common triggering event occurred in association with a player that actively belongs to a designated team, the gaming system provides the team progressive award maintained for that team to the active members of that team. In different embodiments, the determination of which of the team progressive awards associated with the common triggering event to provide to the active players of that team is predetermined, randomly determined, determined based on one or more player's statuses (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In another embodiment, the central controller and/or gaming device processor maintains one or more predetermined awards and one or more team progressive awards for one or more of the teams of players. In this embodiment, if a team progressive award triggering event occurs for one of such teams, the gaming system enables the active members of that team to participate in a suitable game or sequence. In the game or sequence, the gaming system provides the predetermined award to at least one of the active members of the team. In this embodiment, in addition to providing at least one of the active team members with the predetermined award maintained for the team, if the team progressive award triggering event occurs, the gaming system provides the team progressive award associated with the team to the active members of the team as described above. Accordingly, in this embodiment, each active member of the team is provided a portion of the team progressive award and at least one active member of the team is provided a predetermined award associated with the team.

In one alternative embodiment, the gaming system maintains one or more teams or groups for all carded members of a gaming establishment's player tracking club. In this embodiment, the gaming system enables all carded members to belong to one or more teams or groups and play for such team progressive awards. In another embodiment, the gaming system maintains one or more teams or groups for all players currently playing gaming devices in the gaming system (i.e., a player tracking card is not required to belong to a team or group).

In one embodiment, one or more of the team progressive awards are funded, at least partially, via a side-bet or side-wager which the player may make (and which may be tracked via a side-bet meter). In one embodiment, one or more of the team progressive awards are funded with only side-bets or side-wagers placed. In another embodiment, one or more of the team progressive awards are funded based on player's wagers as described above as well as any side-bets or side-wagers placed. In another embodiment, one or more team progressive awards are funded, at least partially, via an amount provided by one or more marketing and/or advertising departments, such as a casino's marketing department. In another embodiment, one or more team progressive awards are funded, at least in part, via a team entry fee which the player makes to join a team. In different embodiments, the player utilizes credits, player tracking points or promotional credits as a team entry fee to join a team. It should be appreciated that any suitable manner of funding the team progressive awards may be implemented in accordance with the gaming system disclosed herein.

In one embodiment, more than one of the team progressive awards start at the same level, such as $10 and increment or increase until provided to the members of a team. In another embodiment, more than one of the team progressive awards start at different levels and increment or increase until provided to the members of a team. In other embodiments, two or more of the team progressive awards may be funded by different percentages. In these embodiments, the central server and/or individual gaming device processor continues to increase the team progressive awards until a team progressive award is provided to the members of a team, at which point the team progressive award is reset and team progressive award starts incrementing from the appropriate default team progressive award level. In another embodiment, one or more team progressive awards increment a predetermined amount per game played. In one such embodiment, this incremental amount is partially funded by an amount of the wagers placed and is partially funded by an amount provided by a gaming establishment marketing or advertisement department. In different embodiments, the gaming establishment marketing or advertisement department provides a value or amount to the team progressive award based on matching a percentage of wagers placed, a predetermined amount for each game played, an elapsed period of time, or any other suitable manner.

In another embodiment, two or more of the team progressive awards may be funded at different temporal rates. In this embodiment, the different team progressive awards are incremented or funded in different increments of time wherein until the team progressive award hits, a set amount is added to the team progressive award at each determined time increment. In another embodiment, two or more of the team progressive awards may each be incremented or funded based on different incrementing factors or incrementors. In this embodiment, a first of the team progressive awards may increment each time a first incrementing factor occurs and a second of the team progressive awards may increment each time a second incrementing factor occurs, wherein the first incrementing factor and the second incrementing factor are different. Examples of incrementing factors could be a symbol-driven trigger in the base game, the player betting a maximum amount, a percentage of possible gaming machines being actively played or in active status, or any other suitable method for defining an incrementor.

In another embodiment, an occurrence of an equity accumulation event occurs based on different triggers for different teams. For example, an equity accumulation event occurs for a first player that actively belongs to first team based on an amount of time that player has been playing. In this example, an equity accumulation event occurs for a player that actively belongs to a second team based on that player winning an outcome in a primary game. In another embodiment, different teams are associated with different occurrences of equity accumulation events. For example, an equity accumulation event occurs for a first player that actively belongs to first team based on that player wagering $10 of coin-in at the gaming devices in the gaming system. In this example, an equity accumulation event occurs for a player that actively belongs to a second team based on that player wagering $15 of coin-in at the gaming devices in the gaming system. In another example, different players of the same team are associated with different equity accumulation events. For example, an equity accumulation event occurs for a first player that actively belongs to first team based on that player wagering $10 of coin-in at the gaming devices in the gaming system. In this example, an equity accumulation event occurs for a second player that actively belongs to the first team based on that player wagering $15 of coin-in at the gaming devices in the gaming system.

In another embodiment, upon an occurrence of an equity accumulation event, a plurality of players each accumulate equity in a group or team. In different embodiments, which players accumulate equity in which teams is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In another embodiment, upon an occurrence of an equity accumulation event, a player accumulates equity in a plurality of groups or teams. In this embodiment, a player can only be actively associated or actively belong to one team or group at any given time, but the player may accumulate equity in a group or team which they are passively associated with. In different embodiments, which teams and the quantity of teams a player accumulates equity in is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In one embodiment, the gaming system enables a player to switch to any maintained team or group in the gaming system. In another embodiment, the gaming system enables a player to switch to a plurality, but not all, of the maintained teams or groups in the gaming system. In different embodiments, which teams or groups a player may switch to is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In another embodiment, the gaming system enables a player to exchange equity accumulated in one team for equity accumulated in a different team. In one such embodiment, a player exchanges accumulated equity in one team for another player's accumulated equity in another team. In another such embodiment, a player exchanges accumulated equity in one team with the gaming system for accumulated equity in another team. In this embodiment, the gaming system includes one or more exchange rates for exchanging or converting accumulated equity in one team for accumulated equity in another team.

In one embodiment, any player actively playing a gaming device may exchange accumulated equity in one team for accumulated equity in another team. In another embodiment, some but not all of the players actively playing gaming devices may exchange accumulated equity in one team for accumulated equity in another team. In different embodiments, the determinations of whether a player may exchange accumulated equity in one team for accumulated equity in another team, which teams a player may exchange equity in and/or the rate for such exchanges is predetermined, randomly determined, determined based that player's status (determined through a suitable player tracking system), determined based on a random determination by the central controller, determined based on a random determination at the gaming machine, determined based on one or more side wagers placed, determined based on the player's primary game wager, determined based on time (such as the time of day) or determined based on any other suitable method or criteria.

In one embodiment, one or more players are enabled to purchase equity in one or more teams from the gaming system. In one embodiment, any player actively playing a gaming device may purchase equity in one or more teams. In another embodiment, some but not all of the players actively playing gaming devices may purchase equity in one or more teams. In different embodiments, the determinations of whether a player may purchase equity in one or more teams, how much equity may be purchased and/or a cost for such purchased equity is predetermined, randomly determined, determined based that player's status (determined through a suitable player tracking system), determined based on a random determination by the central controller, determined based on a random determination at the gaming machine, determined based on one or more side wagers placed, determined based on the player's primary game wager, determined based on time (such as the time of day) or determined based on any other suitable method or criteria.

In one embodiment, if the team progressive award triggering event occurs and the eligible members of a team are provided a team progressive award, the gaming system enables a player to defer or delay winning their relative portion of the provided team progressive award. In this embodiment, the gaming system enables the player to escrow or save their accumulated equity in a team or group, wherein part or all of the player's escrowed equity in the team is carried over and applied to the team or group at a later time. For example, if a team progressive award triggering event occurs, the eligible members of a team are provided a progressive award of $1500 and a player has accumulated equity of 1% in the team, the player may escrow their accumulated equity, forfeit any portion of the provided team progressive award and retain an accumulated equity of 1% in the team for another occurrence of a team progressive award triggering event.

In another embodiment, stored or escrowed accumulated equity in one or more teams are associated with a time period for usage. Such stored accumulated equity in one or more teams may be associated with a time of day, certain day(s) of week, a month and/or a year which they can be used. In one such embodiment, the central server excludes the player from applying their accumulated equity in one or more teams during certain days and times. For example, a player's previously stored accumulated equity in one or more teams is available for play every day in July from 8:00 am to 5:00 pm except July 4.

In another embodiment, accumulated equity in one or more teams are associated with an expiration date and time. In this embodiment, the gaming system/gaming device is configured to communicate to the player the proximity of the expiration of any stored accumulated equity in one or more teams (i.e., "your accumulated equity in Team A will expire at 6:00 am tomorrow"). In one embodiment, such notice of expiration of a stored accumulated equity in one or more teams is at the player's currently played gaming device. In another embodiment, such notice of expiration of any stored accumulated equity in one or more teams is external from the player's currently played gaming device, such as via e-mail or a text message.

Information Provided to Player

In one embodiment, the gaming system displays to each player their minimum accumulated equity in one or more teams, their relative amount of minimum accumulated equity in one or more teams and/or the team progressive awards played for or associated with each team the player has accumulated equity. That is, the gaming system displays any suitable information to the player to convey to the player that as the player continues to play in association with a team, the player's relative equity stake in the team may increase because certain other players stop playing in association with the team and thus stop accumulating equity in the team. In different embodiments, the gaming system displays to a player any suitable information regarding their team(s) and their gaming experience via the gaming device, a device connected to a data network, such as the internet, a player tracking device, a service window, or a kiosk.

As indicated above, the team progressive awards may be provided to the players of a team with or without explanation or information provided to the player, or alternatively information can be displayed to the player. In one embodiment, suitable information about these team progressive awards can be provided to the players through one or more displays on the gaming machines or additional information displays positioned near the gaming machines, such as above a bank of system gaming machines.

This information can be used to entertain the player or inform the player that a progressive award triggering event has occurred or will occur. Examples of Such Information are:

(1) that a team progressive award triggering event has occurred;

(2) that a team progressive triggering event will shortly occur (i.e., foreshadowing the possible providing of a team progressive award);

(3) that an equity accumulation event has occurs;

(4) that an equity accumulation event will shortly occur (i.e., foreshadowing the possible providing of an accumulation of equity in a team)

(5) that one or more team progressive awards have been provided to one or more players of a team;

(6) which team members at which gaming machines have won the team progressive award;

(7) the amount of the team progressive won;

(8) the highest team progressive award won;

(9) the lowest team progressive award won;

(10) the average team progressive award won;

(11) number of games played/total time since the last team progressive award was won;

(12) the average time between team progressive awards being hit;

(13) the number of team progressive awards of won in a designated time period;

(14) the amount of the team progressive awards that can be won;

(15) which team a player is currently actively associated with and/or passively associated with; and

(16) which other teams are currently available for the player to switch to.

It should be appreciated that such information can be provided to the players through any suitable audio, audio-visual or visual devices.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming system comprising:

a plurality of gaming devices, each gaming device including at least one input device;

at least one display device associated with at least one of said gaming devices; and at least one controller configured to operate with each of said gaming devices and said at least one display device to:

(a) maintain and cause a display of a team award;

(b) after an occurrence of an equity accumulation event, accumulate an amount of equity associated with a team for a player at one of said gaming devices, wherein the accumulated amount of equity is independent from any amounts of any wagers placed on any plays of any displayed games; and (c) after an occurrence of a team award triggering event:

(i) determine if any players at any of said gaming devices are actively associated with the team within a designated time period after the occurrence of the team award triggering event, and (ii) for each of any players actively associated with the team within the designated time period after the occurrence of the team award triggering event, determine and display a portion of the team award, wherein said determined and displayed portion of the team award is based on that player's accumulated amount of equity associated with the team relative to a total amount of equity associated with the team accumulated for each of the players actively associated with the team within the designated time period after the occurrence of the team award triggering event and if a first player has a first accumulated amount of equity associated with the team and a second, different player has a second, different accumulated amount of equity associated with the team, a first portion of the team award is determined for the first player and a second, different portion of the team award is determined for the second player.

2. The gaming system of claim 1, wherein the team award is a progressive award.

3. A gaming system comprising:

a plurality of gaming devices, each gaming device including at least one input device;

at least one display device associated with at least one of said gaming devices; and at least one controller configured to operate with each of said gaming devices and said at least one display device to:

(a) maintain a plurality of teams of a plurality of players of said gaming devices;

(b) maintain a plurality of team awards, each team award associated one of the teams, and each team having an associated team award;

(c) receive signals from the input devices activated by the players to select which teams to be initially actively associated with and which teams to be subsequently actively associated with;

(d) for each player actively associated with one of said teams, if an equity accumulation event occurs, accumulate a quantity of team equity accumulation units for said player associated with said team, wherein the accumulated quantity of team equity accumulation units is independent from any amounts of any wagers placed on any plays of any displayed games; and (e) for each team, if a team award triggering event occurs, for each of any players actively associated with said team and with a designated level of accumulated team equity accumulation units, determine and display a portion of the team award for said player associated with said team, wherein said portion is based on said player's accumulated quantity of team equity accumulation units relative to the total quantity of team equity accumulation units accumulated for all of the players actively associated with the team and if a first player has a first quantity of accumulated team equity accumulation units and a second, different player has a second, different quantity of accumulated team equity accumulation units, a first portion of the team award is determined for the first player and a second, different portion of the team award is determined for the second player.

4. The gaming system of claim 3, wherein for each team, if a team award triggering event occurs, for each player actively associated with said team and with a designated level of accumulated team equity accumulation units after a first redemption period, the at least one controller is configured to determine and display a portion of the team award for said player actively associated with said team, wherein said portion is based on said player's quantity of accumulated team equity accumulation units relative to the total quantity of team equity accumulation units accumulated for all players actively associated with the team after the first redemption period.

5. The gaming system of claim 3, wherein said equity accumulation event occurs based on at least one displayed event occurring in at least one play of at least one displayed game of at least one of said gaming devices.

6. The gaming system of claim 3, wherein said equity accumulation event occurs independent of any displayed events in any plays of any displayed games of any of the gaming devices.

7. The gaming system of claim 3, wherein said team award triggering event occurs based on at least one displayed event occurring in at least one play of at least one displayed game of at least one of said gaming devices.

8. The gaming system of claim 3, wherein said team award event occurs independent of any displayed events in any plays of any displayed games of any of the gaming devices.

9. The gaming system of claim 3, wherein the team award is a progressive award.

10. A gaming system comprising:

a plurality of gaming devices, each gaming device including at least one input device;

at least one display device associated with at least one of said gaming devices; and at least one controller configured to operate with each of said gaming devices and said at least one display device to:

(a) maintain and cause a display of a team progressive award;

(b) enable a player at one of said gaming devices to make an input to select to be actively associated with one of a first team and a second team, wherein said team progressive award is associated with the first team;

(c) if the player selects to be actively associated with the first team, after an occurrence of a first team equity accumulation event, provide the player a quantity of equity accumulation units associated with the first team, wherein the quantity of provided equity accumulation units associated with the first team is independent from any amounts of any wagers placed on any plays of any displayed games;

(d) enable the player to make an input to select to switch to being actively associated with the second team; and (e) after an occurrence of a team progressive award triggering event for the first team, if the player made said input to switch to being actively associated with the second team:

(i) enable the player to make an input to switch back to being actively associated with the first team, and (ii) if the player made said input to switch back to being actively associated with the first team, determine and display a portion of the team progressive award, wherein said determined and displayed portion of the team progressive award is based on the player's quantity of provided equity accumulation units associated with the first team relative to the total quantity of team equity accumulation units associated with the first team provided to all of the players actively associated with the first team and if a first player has a first quantity of provided equity accumulation units and a second, different player has a second, different quantity of provided equity accumulation units, a first portion of the team progressive award is determined for the first player and a second, different portion of the team progressive award is determined for the second player.

11. The gaming system of claim 10, wherein if the player did not make said input to switch back to being actively associated with the first team, the at least one controller is configured to cause a forfeiture of the player's provided quantity of equity accumulated units associated with the first team.

12. The gaming system of claim 10, wherein the team award is a progressive award.

13. The gaming system of claim 10, wherein said team progressive award is associated with the second team.

14. The gaming system of claim 10, wherein if the player switches to being actively associated with the second team, after an occurrence of a second team equity accumulation event, provide the player a quantity of equity accumulation unit associated with the second team.

15. The gaming system of claim 10, wherein after the occurrence of the team progressive award triggering event, said at least one controller is configured to enable the player to switch back to being actively associated with the first team for a designated redemption period.

16. The gaming system of claim 10, wherein said equity accumulation event occurs based on at least one displayed event occurring in at least one play of at least one displayed game of at least one of said gaming devices.

17. The gaming system of claim 10, wherein said equity accumulation event occurs independent of any displayed events in any plays of any displayed games of any of the gaming devices.

18. The gaming system of claim 10, wherein said team progressive award triggering event occurs based on at least one displayed event occurring in at least one play of at least one displayed game of at least one of said gaming devices.

19. The gaming system of claim 10, wherein said team progressive award event occurs independent of any displayed events in any plays of any displayed games of any of the gaming devices.

20. A gaming system comprising:

a plurality of gaming devices, each gaming device including at least one input device;

at least one display device associated with at least one of said gaming devices; and at least one controller configured to operate with each of said gaming devices and said at least one display device to:

(a) maintain a plurality of teams including at least a first team and a second different team;

(b) maintain and cause a display of at least a first team progressive award associated with the first team and a second team progressive award associated with the second team;

(c) enable a player at one of said gaming devices to make an input to select to be actively associated with one of the first team and the second team;

(d) if the player is actively associated with the first team and a first equity accumulation event occurs, provide the player a quantity of first team equity accumulation units, wherein the provided quantity of first team equity accumulation units is independent from any amounts of any wagers placed on any plays of any displayed games;

(e) if the player is actively associated with the second team and a second equity accumulation event occurs, provide the player at a quantity of second team equity accumulation units, wherein the provided quantity of second team equity accumulation units is independent from any amounts of any wagers placed on any plays of any displayed games;

(f) if a team progressive award triggering event occurs for the first team, for each player with at least one provided first team equity accumulation unit that is actively associated with the first team after a first redemption period, determine and display a portion of the first team progressive award, wherein said determined and displayed portion of the first team progressive award is based on that player's provided quantity of first team equity accumulation units relative to the total quantity of first team equity accumulation units provided to each of the players actively associated with the first team after the first redemption period and if a first player has a first quantity of provided first team equity accumulation units and a second, different player has a second, different quantity of provided first team equity accumulation units, a first portion of the first team progressive award is determined for the first player and a second, different portion of the first team progressive award is determined for the second player, and (g) if a team progressive award triggering event occurs for the second team, for each player with at least one provided second team equity accumulation unit that is actively associated with the second team after a second redemption period, determine and display a portion of the second team progressive award, wherein said determined and displayed portion of the second team progressive award is based on that player's provided quantity of second team equity accumulation units relative to the total quantity of second team equity accumulation units provided to the players actively associated with the second team after the second redemption period and if the first player has a first quantity of provided second team equity accumulation units and the second, different player has a second, different quantity of provided second team equity accumulation units, a first portion of the second team progressive award is determined for the first player and a second, different portion of the second team progressive award is determined for the second player.

21. The gaming system of claim 20, wherein at least one of the team awards is a progressive award.

22. The gaming system of claim 20, wherein said equity accumulation event occurs based on at least one displayed event occurring in at least one play of at least one displayed game of at least one of said gaming devices.

23. The gaming system of claim 20, wherein said equity accumulation event occurs independent of any displayed events in any plays of any displayed games of any of the gaming devices.

24. The gaming system of claim 20, wherein said team progressive award triggering event occurs based on at least one displayed event occurring in at least one play of at least one displayed game of at least one of said gaming devices.

25. The gaming system of claim 20, wherein said team progressive award event occurs independent of any displayed events in any plays of any displayed games of any of the gaming devices.

* * * * *

UNITED STATES PATENT AND TRADEMARK OFFICE

CERTIFICATE OF CORRECTION

PATENT NO. : 8,500,548 B2
APPLICATION NO. : 11/937353
DATED : August 6, 2013
INVENTOR(S) : Anthony J. Baerlocher et al.

It is certified that error appears in the above-identified patent and that said Letters Patent is hereby corrected as shown below:

IN THE CLAIMS

In Claim 3, Column 49, Line 35, between “associated” and “one” insert --with--.
In Claim 3, Column 49, Line 55, replace “the” with --a--.
In Claim 4, Column 49, Line 66, replace “a” with --the--.
In Claim 4, Column 49, Line 67, replace “a” with --the--.
In Claim 4, Column 50, Line 6, replace “the” with --a--.
In Claim 8, Column 50, Line 22, after “award” insert --triggering--.
In Claim 10, Column 50, Line 63, replace the second instance of “the” with --a--.
In Claim 10, Column 50, Line 65, delete “of the”.
In Claim 12, Column 51, Line 12, after “team” insert --progressive--.
In Claim 14, Column 51, Line 19, between “event,” and “provide” insert --the at least one controller is configured to--.
In Claim 19, Column 51, Line 39, between “award” and “event” insert --triggering--.
In Claim 20, Column 52, Line 1, delete “at”.
In Claim 20, Column 52, Line 14, replace “the” with --a--.
In Claim 20, Column 52, Line 16, replace “the” with --any--.
In Claim 20, Column 52, Line 27, replace “a team” with --the team--.
In Claim 20, Column 52, Line 37, replace “the total” with --a total--.
In Claim 20, Column 52, Line 38, replace “the players” with --each of any players--.
In Claim 21, Column 52, Line 49, between “team” and “awards” insert --progressive--.
In Claim 22, Column 52, Line 51, replace “event” with --events-- and replace “occurs” with --occur--.
In Claim 23, Column 52, Line 56, replace “event” with --events-- and replace “occurs” with --occur--.
In Claim 25, Column 52, Line 64, between “award” and “event” insert --triggering--.

Signed and Sealed this
Seventeenth Day of December, 2013

Margaret A. Focarino

Margaret A. Focarino
*Commissioner for Patents of the United States Patent and Trademark Office*

UNITED STATES PATENT AND TRADEMARK OFFICE

CERTIFICATE OF CORRECTION

PATENT NO. : 8,500,548 B2
APPLICATION NO. : 11/937353
DATED : August 6, 2013
INVENTOR(S) : Baerlocher et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1399 days.

Signed and Sealed this
Twentieth Day of January, 2015

Michelle K. Lee

Michelle K. Lee
*Deputy Director of the United States Patent and Trademark Office*